(12) United States Patent
Wada

(10) Patent No.: US 6,437,938 B1
(45) Date of Patent: Aug. 20, 2002

(54) LOADING/THREADING MECHANISM OF CARTRIDGE MAGNETIC TAPE APPARATUS

(75) Inventor: Satoshi Wada, Yamagata (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/572,289

(22) Filed: May 17, 2000

(30) Foreign Application Priority Data

May 18, 1999 (JP) ............................................. 11-137028

(51) Int. Cl.$^7$ ................................................ G11B 15/67
(52) U.S. Cl. ...................................... 360/95; 242/332.4
(58) Field of Search ...................... 360/93, 95; 242/348, 242/348.3, 332, 332.4, 332.5, 332.7, 332.8

(56) References Cited

U.S. PATENT DOCUMENTS

| | | | | |
|---|---|---|---|---|
| 4,608,614 A | * | 8/1986 | Rinkleib et al. | 242/332.4 |
| 4,987,504 A | * | 1/1991 | Inoue | 360/95 |
| 4,991,037 A | | 2/1991 | Shimizu et al. | 360/95 |
| 5,243,477 A | * | 9/1993 | Grant et al. | 242/332.4 |
| 5,542,620 A | * | 8/1996 | Ohshita | 242/332.4 |
| 5,581,419 A | * | 12/1996 | Kobayashi | 242/332 |
| 6,034,839 A | * | 3/2000 | Hamming | 242/332.4 |

FOREIGN PATENT DOCUMENTS

| | | |
|---|---|---|
| EP | 0 293 267 | 11/1988 |
| EP | 0 326 369 | 8/1989 |
| EP | 0 339 148 | 11/1989 |
| EP | 0 368 667 | 5/1990 |
| JP | 8-17111 | 1/1996 |
| JP | 9-128855 | 5/1997 |
| WO | WO 00/30090 | 5/2000 |
| WO | WO 00/30091 | 5/2000 |
| WO | WO 00/30098 | 5/2000 |

\* cited by examiner

*Primary Examiner*—David L. Ometz
(74) *Attorney, Agent, or Firm*—Sughrue Mion, PLLC

(57) ABSTRACT

A magnetic tape apparatus loading and threading mechanism that moves a cartridge tray accommodating a cartridge between an eject position where the cartridge is mountable in the tray and a mount position where the cartridge reel is engaged with the apparatus. The cartridge tray is engaged with a loader drive plate having a loader drive roller in a loader drive cam groove formed in a loader drive gear. A threading mechanism moves a leader block, engageable with a leader pin at the tip portion of a magnetic tape in the cartridge, between an unload position near the cartridge tray at the mount position, and a load position in the reel of the magnetic tape apparatus. The leader block is engaged with an arm member having a threader drive roller in a threader drive cam groove formed in a threader drive gear engaged with the loader drive gear. At the unload position, the leader block is at a retracted position where the leader block is retracted from the cartridge in the mount position, or a leader pin captured position where the leader block is engaged with the leader pin at the tip portion of the magnetic tape in the cartridge. A single source drives the loading and threading mechanisms, so as the loader drive gear is rotated, the cartridge tray is moved between the eject and mount positions, and the leader block is rotated between the retracted and leader pin captured positions, and moved between the unload and load positions.

24 Claims, 18 Drawing Sheets

F I G. 12A
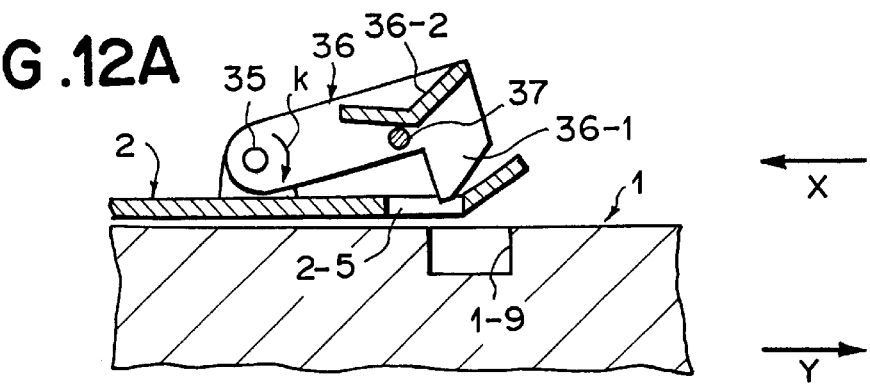
F I G. 12B
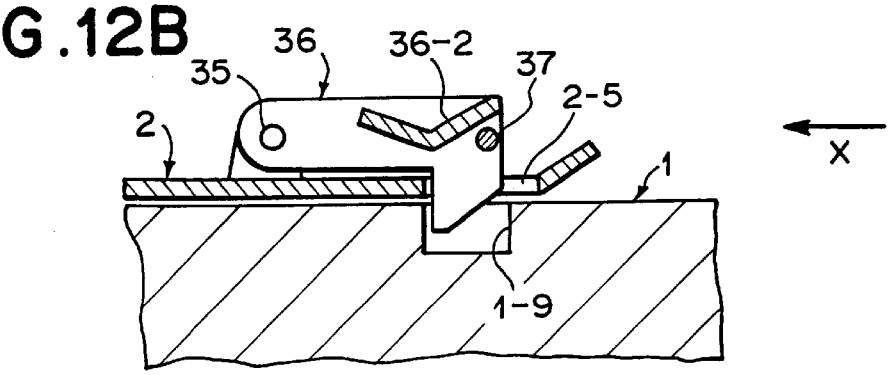
F I G. 13A
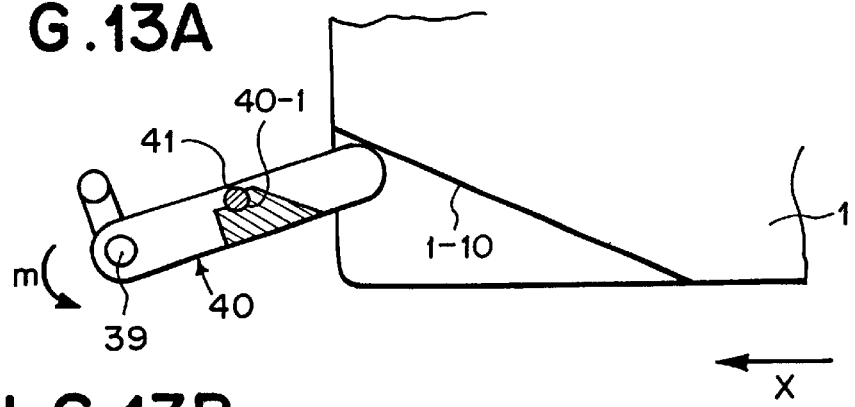
F I G. 13B
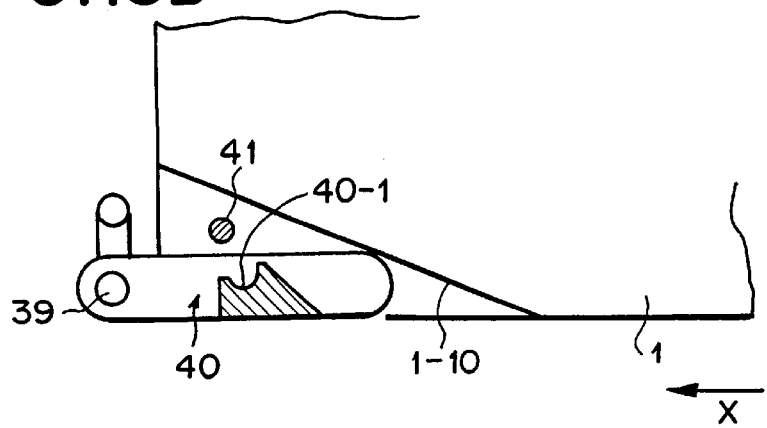

LOADING/THREADING MECHANISM OF CARTRIDGE MAGNETIC TAPE APPARATUS

BACKGROUND OF THE INVENTION

1. Field of the Invention

The present invention relates to a technique for magnetic recording and reproduction, and particularly to a loading and threading mechanism of a magnetic tape apparatus using a single reel cartridge magnetic tape as a storage medium.

2. Description of the Related Art

A single reel cartridge magnetic tape is used as one of storage media for electronic computers. The magnetic tape is secured to one reel at one end portion thereof and wound around the reel. The other end portion of the magnetic tape is provided with a leader block, and the magnetic tape is accommodated in a cartridge while the end portion having the leader block is left at the outside.

When the cartridge is inserted into the magnetic tape apparatus, the cartridge is first fed to and mounted at a predetermined position of the magnetic tape apparatus (loading operation), and then the leader block of the tip portion of the cartridge is moved through a predetermined route, whereby the magnetic tape is fitted to a reel at the magnetic tape apparatus side (machine reel) while the magnetic tape is arranged in the predetermined running route (threading operation).

As disclosed in JP-8-17111(A) or JP-9-128855(A), for example, the loading operation and the threading operation in the single reel cartridge magnetic tape apparatus have been hitherto performed by using separate mechanisms. That is, a loading mechanism for mounting the cartridge in the magnetic tape apparatus and a tape threading mechanism for feeding the tip portion of the magnetic tape of the cartridge to the reel of the magnetic tape apparatus are driven by driving force generating sources which are independent on each other.

Therefore, in the loading and threading mechanisms of the conventional cartridge magnetic tape apparatus, the number of driving force generating sources is large and thus driving circuits for the respective driving force generating sources must be separately provided. In addition, in order to make proper the connection between the operation of the loading mechanism and the operation of the threading operation, a number of sensors for detecting the operating states of the loading mechanism and the threading mechanism must be equipped to the magnetic tape apparatus, and both the mechanisms are controlled on the basis of signals from these sensors. Therefore, the control circuit is complicated, and it obstructs to miniaturize the apparatus and reduce the cost.

SUMMARY OF THE INVENTION

Therefore, an object of the present invention is to reduce the number of driving force generating sources and reduce the number of operating state detecting sensors required for driving control to thereby simplify a control circuit in a mechanism for loading and threading of a cartridge magnetic tape apparatus, thereby aiming to miniaturize the apparatus and reduce the cost.

In order to attain the above object, according to the present invention, there is provided a loading/threading mechanism of a single reel cartridge magnetic tape apparatus, characterized by comprising: a loading mechanism for moving a cartridge tray for accomodating a cartridge between an eject position at which the cartridge is mountable/demountable into/from the cartridge tray and a mount position at which a reel of the cartridge is engaged with cartridge reel rotating means of the magnetic tape apparatus; and a threading mechanism for moving a leader block engageable with a leader pin affixed to the tip portion of a magnetic tape accommodated in the cartridge through a predetermined route between an unload position in the neighborhood of the cartridge tray located at the mount position and a load position in a notch of the core portion of the reel of the magnetic tape apparatus to which the leader block is fitted, wherein at the unload position, the leader block can be located at a retracted position at which the leader block is retracted from the cartridge accommodated on the cartridge tray located at the mount position, and a leader pin captured position at which the leader block is engaged with the leader pin affixed to the tip portion of the magnetic tape in the cartridge accommodated in the cartridge tray, the loading mechanism and the threading mechanism being driven by using a single driving force generating source.

In an aspect of the present invention, the loading mechanism has a loader drive rotator having a loader drive cam groove, and a loader drive member which is reciprocatively movable in one direction to translate the cartridge tray between the eject position and the mount position, the loader drive member has a loader drive engaging member which is engaged with the loader drive cam groove, the threading mechanism has a threader drive rotator having a threader drive cam groove and a threader drive member for driving the leader block to move between the unload position and the load position, the threader drive member has a threader drive engaging member which is engaged with the threader drive cam groove, the loader drive rotator and the threader drive rotator are connected to each other so that a rotational driving force is transmitted therebetween, and a driving force is transmitted from the driving force generating source to one of the loader drive rotator and the threader drive rotator.

In an aspect of the present invention, the loading mechanism has a loader drive cam groove formed in a driving rotator, and a loader drive member which is reciprocatively movable in one direction to translate the cartridge tray between the eject position and the mount position, the loader drive member has a loader drive engaging member which is engaged with the loader drive cam groove, the threading mechanism has a threader drive cam groove formed in the driving rotator and a threader drive member for driving the leader block to move between the unload position and the load position, the threader drive member has a threader drive engaging member which is engaged with the threader drive cam groove, and a driving force is transmitted from the driving force generating source to the driving rotator.

In an aspect of the present invention, the threading mechanism has a retractor for moving the loader drive member under the state that the cartridge tray is disposed at the mount position, thereby shifting the leader block from the retracted position to the leader pin captured position, and the retractor has a pin which is engageable with a retractor cam secured to the loader drive member, and a groove which is engageable with a pin secured to the leader block.

Further, according to the present invention, there is provided a loading/threading for a single reel cartridge magnetic tape apparatus, characterized in that: a loader drive cam groove and a threader drive cam groove are formed on a rotating member;

the loader drive cam groove comprises a first groove portion extending in the circumferential direction so as to be kept away from the rotational center of the rotating member at a fixed distance, and a second groove portion which is linked to one end portion of the first groove portion and extends so that the distance from the rotational center of the rotating member is varied, the loader drive cam groove being engaged with a loader drive engaging member affixed to a loader drive member;

the loader drive member is engaged with a cartridge tray on which a cartridge is accommodated, whereby in the state that the second groove portion is engaged with the loader drive engaging member, during the rotation of the rotating member the cartridge tray is moved between an eject position at which the mount/demount of the cartridge into/from the cartridge tray are enabled and a mount position at which a reel of the cartridge is engageable with cartridge reel rotating means of the magnetic tape apparatus;

the threader drive cam groove comprises a third groove portion extending in the circumferential direction so as to be kept away from the rotational center of the rotating member at a fixed distance and a fourth groove portion which is linked to one end portion of the third groove portion and extends so that the distance from the rotational center of the rotating member is varied, the threader drive cam groove being engaged with the threader drive engaging member affixed to the threader drive member;

the threader drive member is connected to a leader block engageable with a leader pin affixed to the tip portion of a magnetic tape accommodated in the cartridge, whereby in the state that the fourth groove portion is engaged with the threader drive engagement member, during the rotation of the rotating member the leader block is moved through a predetermined route between an unload position in the neighborhood of the cartridge tray located at the mount position and a load position in a notch of the core portion of a reel of the magnetic tape apparatus to which the leader block is fitted;

the first to fourth groove portions are set so that when the loader drive engaging member is engaged with the second groove portion, the threader drive engaging member is engaged with the third groove portion, and when the threader drive engaging member is engaged with the fourth groove portion, the loader drive engaging member is engaged with the first groove portion; and there is provided a single driving force generating source for transferring the rotational driving force to the rotating member.

In an aspect of the present invention, the rotating member comprises a first rotator and a second rotator which are connected to each other so as to be rotatable in synchronism with each other, the loader drive cam groove is formed in the first rotator, and the threader drive cam groove is formed in the second rotator. In an aspect of the present invention, the first rotator is a loader drive gear, and the second rotator is a threader drive gear, the loader drive gear and the threader drive gear being engaged with each other.

In an aspect of the present invention, the loader drive member moves the cartridge tray while a guide engaging member affixed to the cartridge tray is guided in engagement with a loader guide groove formed in a loader guide member. In an aspect of the present invention, the loader guide groove is bent.

In an aspect of the present invention, the leader block is set to be located at one of a retracted position and a leader pin captured position at the unload position, the retracted position being defined as a position at which the leader block is retracted from the cartridge accommodated in the cartridge tray located at the mount position, and the leader pin captured position being defined as a position at which the leader block is engaged with a leader pin affixed to the tip portion of the magnetic tape in the cartridge accommodated in said cartridge tray located at the mount position. In an aspect of the present invention, there is provided a retractor block which is rotatable to rotate the leader block located at the unload position, the retractor block is biased in one rotational direction, the loader drive member is provided with a retractor cam which is engaged with the retractor block to rotate the retractor block in the other rotational direction, and the loader drive member is moved while the cartridge tray is located at the mount position, whereby the leader block is rotated against the biasing force to be shifted from the retracted position to the leader pin captured position. In an aspect of the present invention, there is further included a guide cam for restricting the rotational angle range of the retractor block at the unload position.

In an aspect of the present invention, the cartridge tray is provided with an engaging member which is engaged with a door of the cartridge inserted to the eject position to open the door. In an aspect of the present invention, the cartridge tray is provided with a lock member which is engaged with a lock hole of the cartridge inserted to the eject position to fix the cartridge to the cartridge tray. In an aspect of the present invention, there is further included a lock mechanism for fixing the cartridge tray to the eject position, the lock mechanism abutting against the slant surface of the cartridge to release the fixing. In an aspect of the present invention, the leader block is rotatably held with clearance by a support pin secured to the threader drive member, and a threading cam groove for guiding the support pin when the leader block is moved between the unload position and the load position is disposed.

Further, according to the present invention, there is provided a loading/threading mechanism of a single reel cartridge magnetic tape apparatus equipped with a loading mechanism portion and a threading mechanism portion, characterized in that:

the loading mechanism portion has a loader drive gear;

a loader drive cam groove comprising a circumferential direction groove portion and a non-circumferential direction groove portion is formed in the loader drive gear;

the loader drive cam groove is engaged with a loader drive engaging member affixed to a loader drive plate;

the loader drive plate is engaged with a cartridge tray accommodating a cartridge, whereby in the state that the non-circumferential direction groove portion of the loader drive cam groove is engaged with the loader drive engaging member, during the rotation of the loader drive gear the cartridge tray is moved between an eject position at which the mount/demount of the cartridge into/from the cartridge tray is enabled and a mount position at which a reel of the cartridge is engageable with cartridge reel rotating means of the magnetic tape apparatus;

the threading portion has a threader drive gear engageable with the loader drive gear;

a threader drive cam groove comprising a circumferential direction groove portion and a non-circumferential direction groove portion is formed in the threader drive gear;

the threader drive cam groove is engaged with a threader drive engaging member which is affixed to a threader drive arm member rotatable around the rotating center parallel to the rotational center of the threader drive gear so as to be eccentric to the rotating center;

the threader drive arm member is connected to a leader block engageable with a leader pin affixed to the tip portion of a magnetic tape accommodated in the cartridge, whereby in the state that the non-circumferential direction groove portion of the threader drive cam groove is engaged with the threader drive engaging member, during the rotation of the threader drive gear the leader block is moved through a predetermined route between an unload position in the neighborhood of the cartridge tray located at the mount position and a load position in a notch of the core portion of a reel of the magnetic tape apparatus to which the leader block is fitted, the loader drive gear and the threader drive gear are engaged with each other so that when the loader drive engaging member is engaged with the non-circumferential direction groove portion of the loader drive cam groove, the threader drive engaging member is engaged with the circumferential direction groove portion of the threader drive cam groove, and when the threader drive engaging member is engaged with the non-circumferential direction groove portion of the threader drive cam groove, the loader drive engaging member is engaged with the circumferential direction groove portion of the loader drive cam groove, and there is provided a driving motor for driving the rotation of the loader drive gear or the thread drive gear.

Still further, according to the present invention, there is provided a loading/threading mechanism of a single reel cartridge magnetic tape apparatus, characterized in that:

a driving rotator is provided;

a loader drive cam groove comprising a first circumferential direction groove portion and a first non-circumferential direction groove portion and a threader drive cam groove comprising a second circumferential direction groove portion and a second non-circumferential direction groove portion are formed in the driving rotator;

the loader drive cam groove is engaged with a loader drive engaging member affixed to a loader drive plate;

the loader drive plate is engaged with a cartridge tray for accommodating a cartridge, whereby in the state that the first non-circumferential direction groove portion of the loader drive cam groove is engaged with the loader drive engaging member, during the rotation of the rotator, the cartridge tray is moved between an eject position at which the mount/demount of the cartridge into/from the cartridge tray is enabled and a mount position at which a reel of the cartridge is engageable with cartridge reel rotating means of the magnetic tape apparatus;

the threader drive cam groove is engaged with a threader drive engaging member which is affixed to a threader drive arm member rotatable around the rotating center parallel to the rotational center of the rotator so as to be eccentric to the rotating center;

the threader drive arm is connected to a leader block engageable with a leader pin affixed to the tip portion of a magnetic tape accommodated in the cartridge, whereby in the state that the second non-circumferential direction groove portion of the threader drive cam groove is engaged with the threader drive engaging member, during the rotation of the rotator, the leader block is moved through a predetermined route between an unload position in the neighborhood of the cartridge tray located at the mount position and a load position in a notch of the core portion of a reel of the magnetic tape apparatus to which the leader block is fitted; and the loader drive cam groove and the threader drive cam groove are set to have such a phase that when the loader drive engaging member is engaged with the first non-circumferential direction groove portion of the loader drive cam groove, the threader drive engaging member is engaged with the second circumferential direction groove portion of the threader drive cam groove, and when the threader drive engaging member is engaged with the second non-circumferential direction groove portion of the threader drive cam groove, the loader drive engaging member is engaged with the first circumferential direction groove portion of the loader drive cam groove.

In an aspect of the present invention, there is further included a retractor block engageable with the leader block located at the unload position, wherein the retractor block is rotatable between a first attitude and a second attitude and biased so as to have the first attitude by biasing means, and the retractor block is engaged with the leader block so that in the first attitude the leader block is retracted from the cartridge accommodated in the cartridge tray located at the mount position while in the second attitude the leader block is advanced to the cartridge accommodated in the cartridge tray located at the mount position, the retractor block being set to the second attitude against the biasing force of the biasing means when a retractor cam affixed to the loader drive plate abuts against the retractor block. In an aspect of the present invention, the biasing means comprises a spring. In an aspect of the present invention, the leader block is rotatably secured to the threader drive arm member and has an engaging projection which is engageable with the retractor block, and the retractor block has an engaging groove which is engageable with the engaging projection.

In an aspect of the present invention, a leader pin capture groove engageable with the leader pin is formed in the leader block. In an aspect of the present invention, there is further included a threading guide groove for setting the predetermined route of the movement of the leader block, and the threader drive arm member is provided with a threading guide engaging member which is engageable with the threading guide groove. In an aspect of the present invention, the threader drive arm member comprises a first arm portion which is rotatable around the rotating center and has the threader drive engaging member, and a second arm portion which is rotatably connected to the first arm portion and connected to the leader block.

According to the loading/threading mechanism of the present invention, the movement of the cartridge tray between the eject position and the mount position, the movement of the leader block at the unload position between the retract position and the leader pin capture position and the movement of the leader block between the leader pin capture position and the load position can be performed by the sequential operation using a single driving force generating source. Accordingly, the state of the loading/threading operation can be easily and simply detected, and the number of state detecting sensors for the control of the apparatus can be reduced. Further, according to the loading/threading mechanism of the present invention, the number of driving force generating sources can be reduced. Therefore, the control circuit of the apparatus can be simplified, and the apparatus can be miniaturized in size and reduced in cost.

Further, the conventional loading/threading mechanism needs the lock mechanism in order to inhibit the ejecting operation of the cartridge when the leading end of the magnetic tape is out of the cartridge. However, according to the present invention, no lock mechanism is required because a sequential operation is carried out by a single driving force generating source.

BRIEF DESCRIPTION OF THE DRAWINGS

FIGS. 12A and 12B are cross-sectional views showing a cartridge lock mechanism to a cartridge tray in the first embodiment of the loading/threading mechanism of the present invention;

FIGS. 13A and 13B are cross-sectional views showing a cartridge tray lock mechanism in the first embodiment of the loading/threading mechanism of the present invention;

DETAILED DESCRIPTION OF THE PREFERRED EMBODIMENTS

Preferred embodiments according to the present invention will be described hereunder with reference to the accompanying drawings.

FIG. 1A is a plan view showing the overall structure of a first embodiment of a loading/threading mechanism of a cartridge magnetic tape apparatus according to the present invention, and FIG. 1B is a partial, enlarged view of FIG. 1A. FIG. 2 is a side view of the loading/threading mechanism of the first embodiment. In the mechanism of this embodiment, a loading mechanism portion and a threading mechanism portion are arranged in the following predetermined connecting relationship on a deck base 3. In FIG. 1A, the loading mechanism portion is mainly located at the right side and the threading mechanism portion is mainly located at the left side.

The loading mechanism portion functions to feed in the direction of an arrow X a single reel cartridge 1 inserted in the direction of the arrow X to move the single reel cartridge 1 to a predetermined position at which a magnetic tape wound in the cartridge 1 can be extended (drawn) and rewound, and also feed the cartridge 1 having the magnetic tape rewound therein from the above predetermined position in the direction of an arrow Y to a position at which the cartridge 1 can be discharged in the direction of the arrow Y. The threading mechanism portion functions to draw out the tip portion (leading portion) of the magnetic tape from the cartridge 1 located at the predetermined position by the loading mechanism, guide it to a take-up reel (machine reel) disposed in the magnetic tape apparatus through a predetermined route passing by a magnetic head for performing recording/reproducing operation on the magnetic tape, and connect the tip portion of the magnetic tape to the core portion of the machine reel. When the magnetic tape is rewound into the cartridge 1, the threading mechanism portion also functions to pick up the tip portion of the magnetic tape from the core portion of the machine reel and move it back through the predetermined route to return it into the cartridge 1.

[Cartridge]

Figure 3:
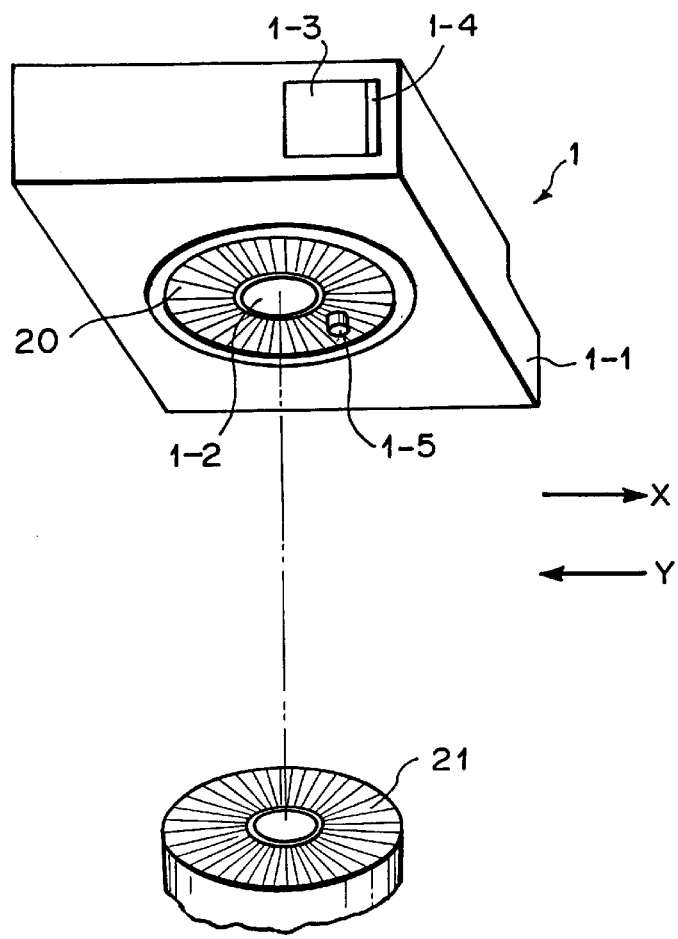
FIG. 3 is a perspective view showing a single reel cartridge.
Figure 4:
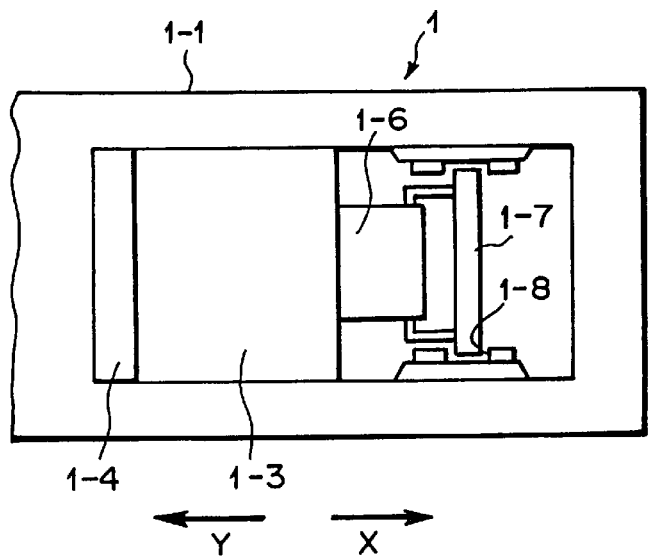
FIG. 4 is a partial side view showing the single reel cartridge.

First, a single reel cartridge 1 used in this embodiment will be described with reference to FIGS. 3 to 5. FIG. 3 is a perspective view showing the cartridge 1. The cartridge 1 includes a casing 1-1 and a cartridge reel 1-2 which is accommodated in the casing 1-1 and around which a magnetic tape is wound. A door 1-3 is formed on the side end surface of the casing 1-1. FIG. 4 is a partial side view showing the cartridge 1 when the door 1-3 is opened, and FIG. 5 is a partial, cross-sectional view of the cartridge 1 of FIG. 4.

The cartridge 1 is inserted into the loading mechanism portion in the direction of the arrow X shown in FIGS. 3 and 4. The door 1-3 is biased or urged in the direction of the arrow X by biasing means or urging means such as a spring or the like (not shown), and the opening of the cartridge 1 is closed by the door 1-3 as shown in FIG. 3 before the cartridge 1 is inserted into the loading mechanism portion. An engaging projection 1-4 is formed on the door 1-3, and it is engaged with an engaging member in the loading mechanism portion when the cartridge 1 is loaded, whereby when the loading operation is completed, the door 1-3 is moved in the direction of the arrow Y to keep the cartridge open as shown in FIG. 4.

In FIG. 3, only the lower surface side portion of the core portion of the cartridge reel 1-2 appears, and a face gear 20 is formed at this place. When the loading operation is completed, the reel face gear 20 is engaged with a face gear 21 connected to a cartridge reel driving motor to allow the rotational driving of the cartridge reel 1-2. The cartridge reel 1-2 is equipped with a lock pin 1-5 projecting through the face gear thereof, and the lock pin 1-5 is downwardly biased until the cartridge reel 1-2 is engaged with the driving motor face gear 21, whereby the rotation of the cartridge reel 1-2 relatively to the casing 1-1 is prevented by a lock mechanism (not shown). The upward movement of the lock pin 1-5 through the engagement with the driving motor face gear 21 releases the lock to allow the rotation of the cartridge reel 1-2 relatively to the casing 1-1.

Figure 5:
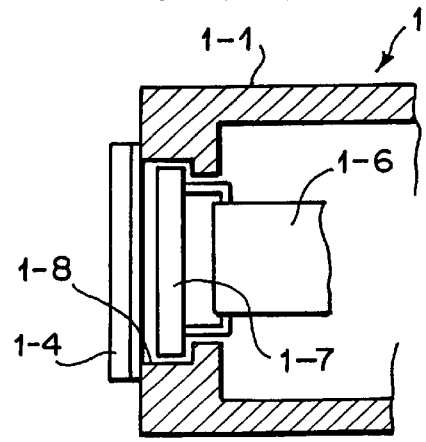
FIG. 5 is a partial, sectional view showing the single reel cartridge.

As shown in FIGS. 4 and 5, a leader pin 1-7 is secured to the tip of the magnetic tape 1-6 wound around a cartridge reel 1-2. The leader pin 1-7 is accommodated in a predetermined accommodating portion 1-8 in the casing 1-1 as shown in FIGS. 4 and 5 in the state that the magnetic tape 1-6 is perfectly wound around the cartridge reel 1-2, whereby the positioning of the leader pin 1-7 to the casing 1-1 is performed.

[Loading Mechanism Portion]

Figure 1:
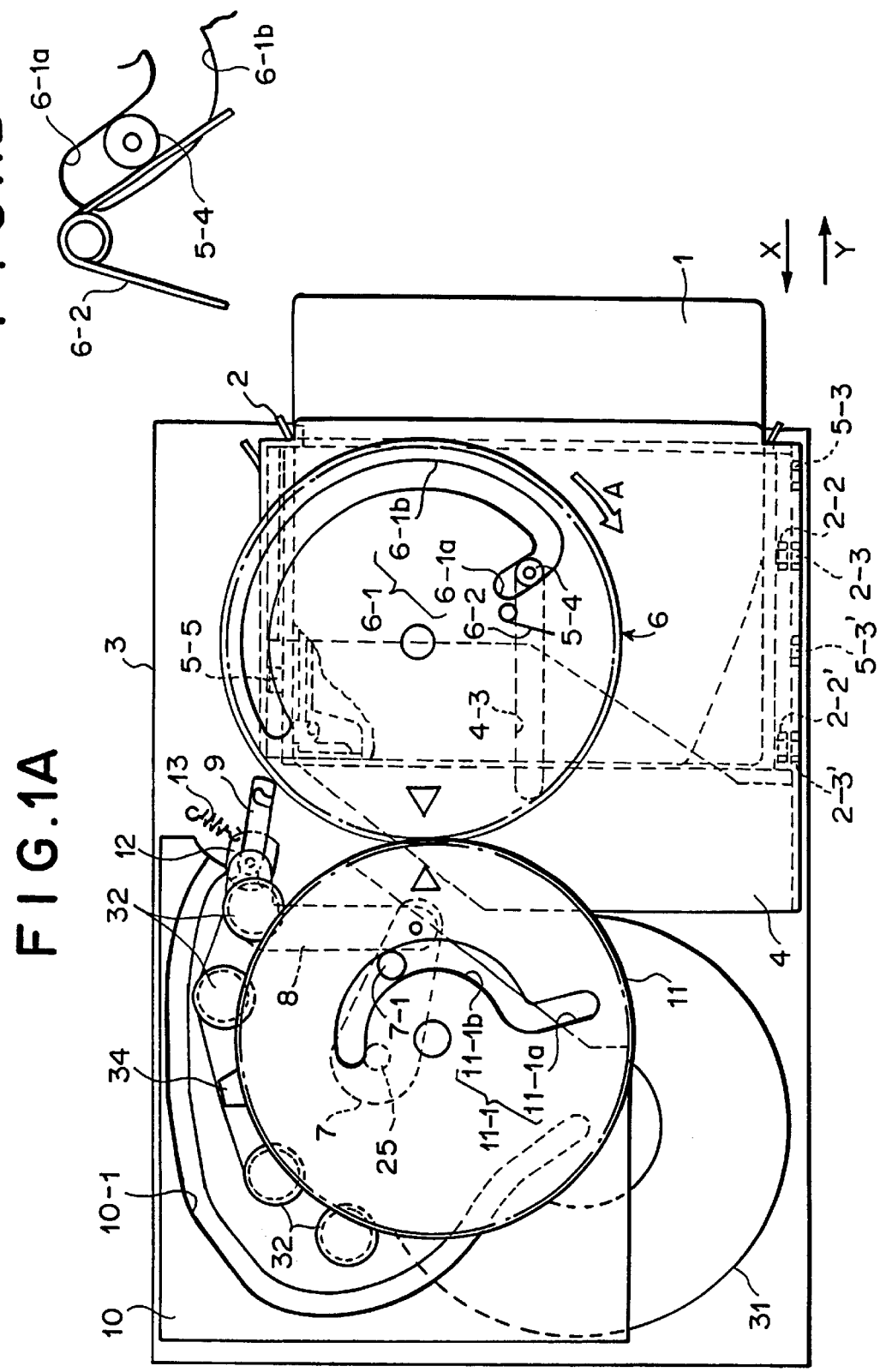
FIG. 1A is a plan view showing a first embodiment of a loading/threading mechanism according to the present invention.
FIG. 1B is a partial, enlarged view of FIG. 1A.
Figure 2:
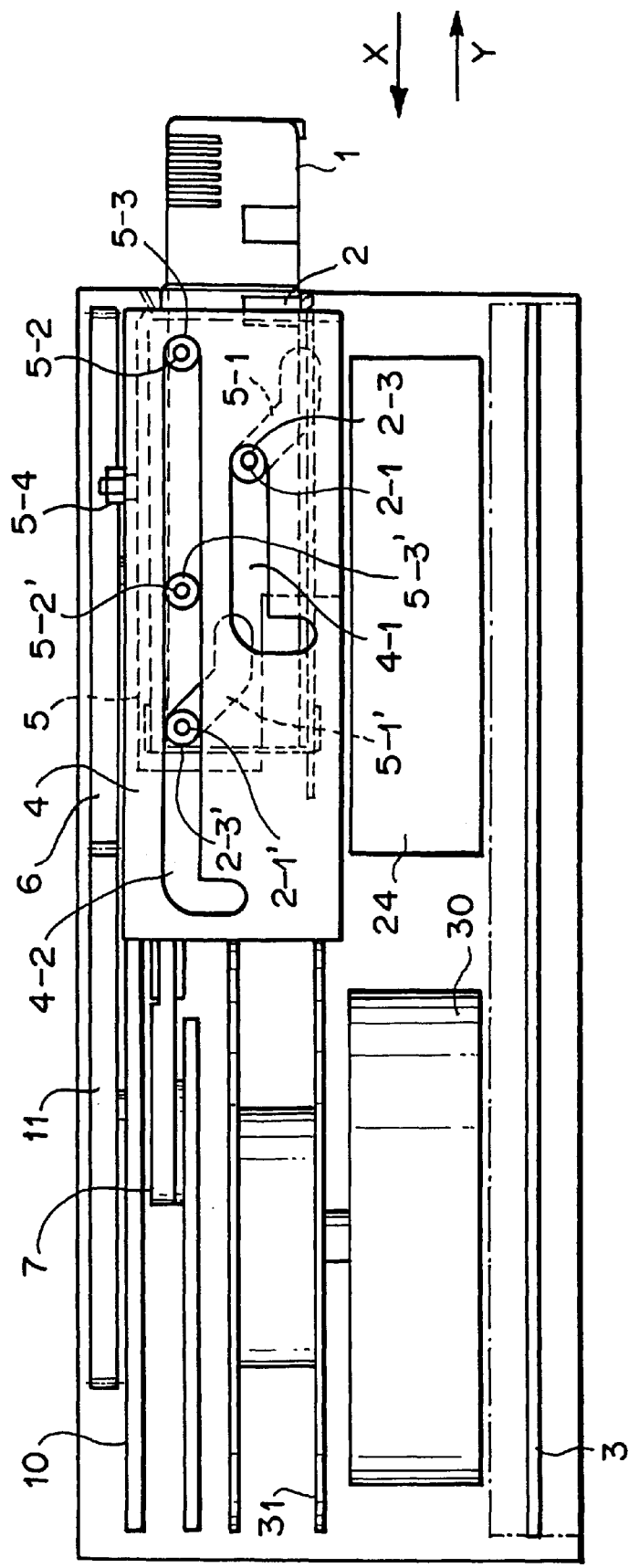
FIG. 2 is a side view showing the first embodiment of the loading/threading mechanism of the present invention.

In the loading mechanism portion, a loader guide plate 4 is disposed so as to be positionally fixed to the deck base 3, a loader drive plate 5 is disposed inside the loader guide plate 4, and a cartridge tray 2 is disposed inside the loader drive plate 5 as shown in FIGS. 1 and 2.

Figure 6:
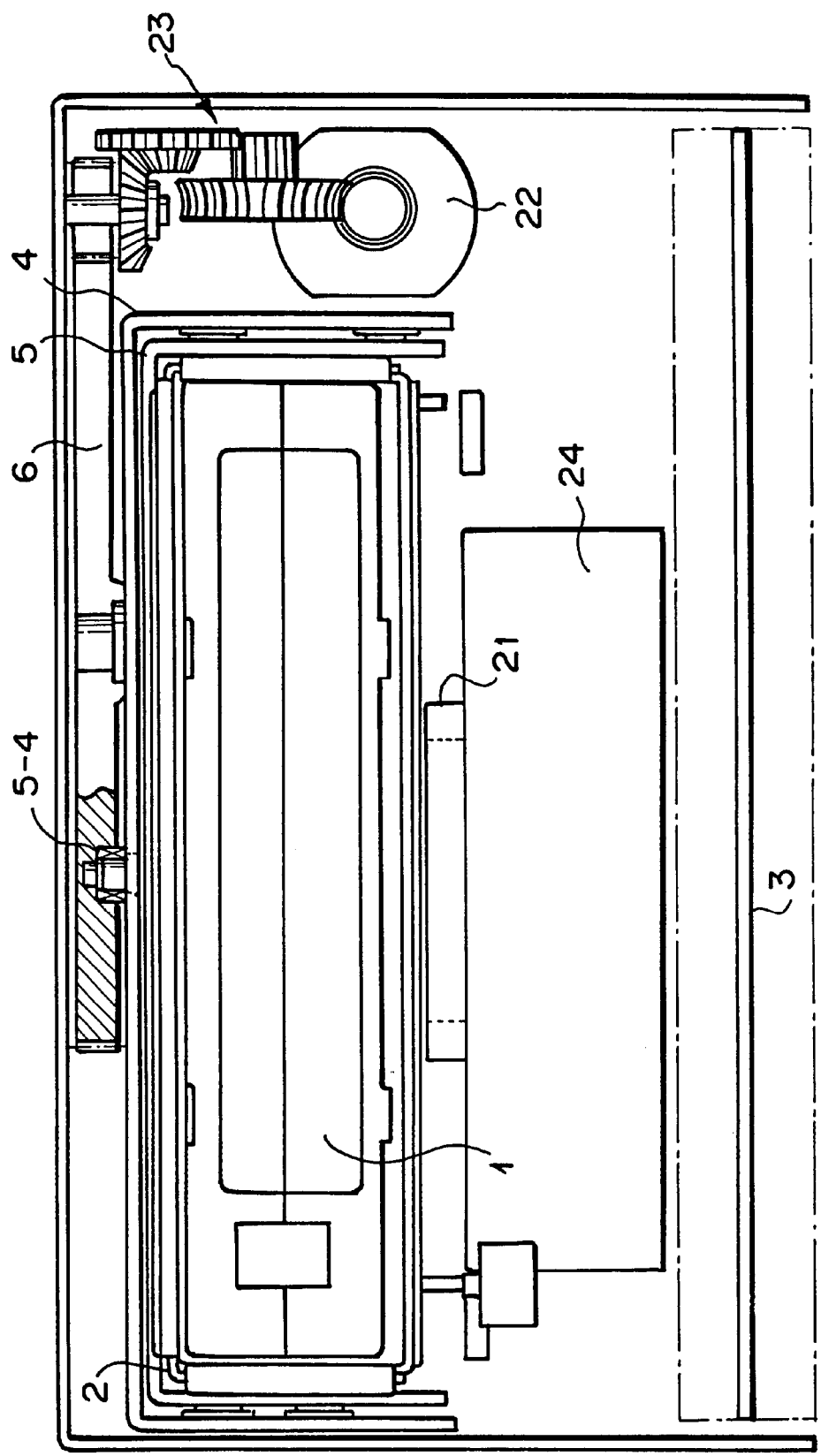
FIG. 6 is a front view showing the first embodiment of the loading/threading mechanism of the present invention.
Figure 7:
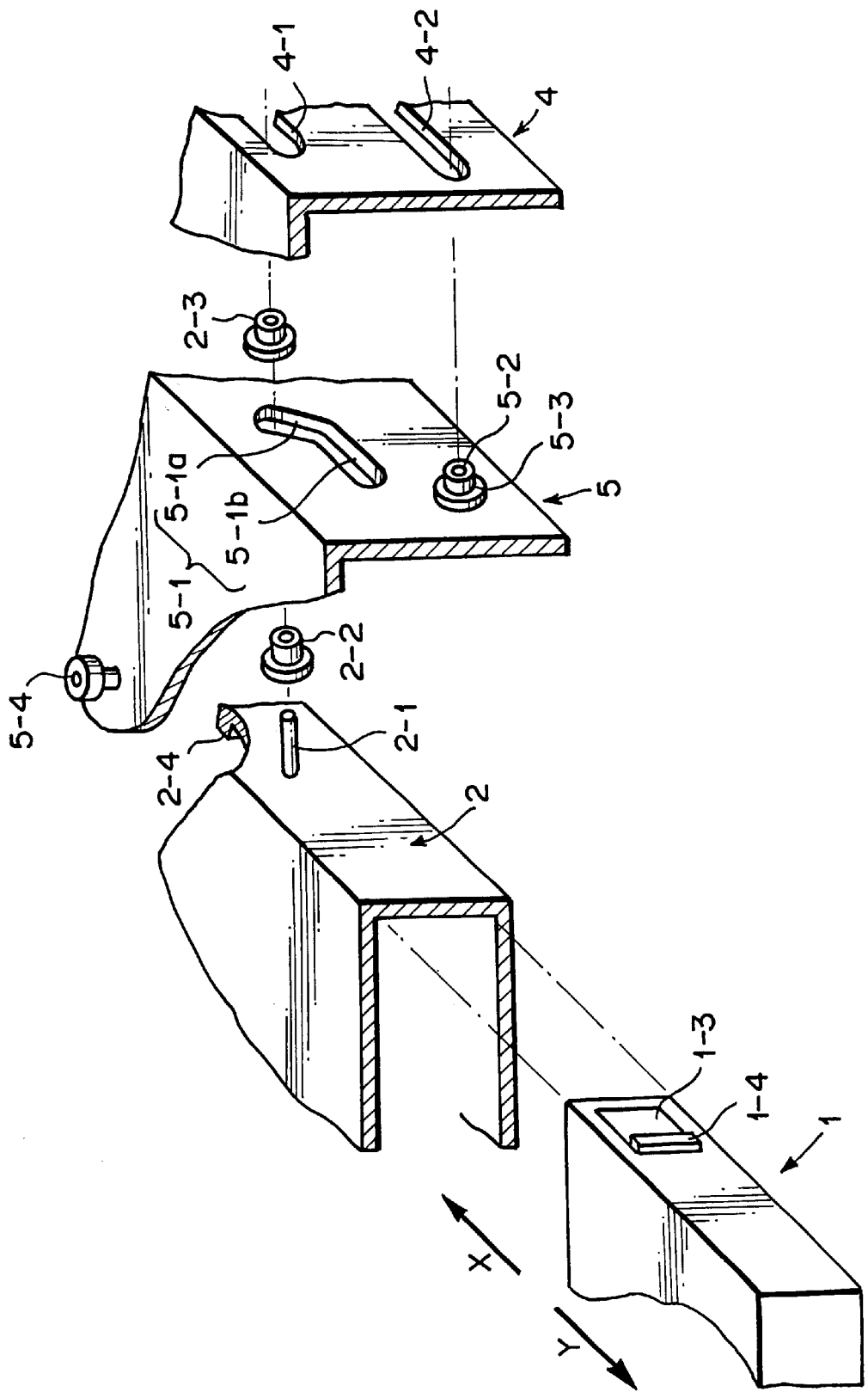
FIG. 7 is a partial, exploded, perspective view showing a loading mechanism portion of the first embodiment of the loading/threading mechanism of the present invention.

FIG. 6 is a front view of this embodiment, which is viewed in the cartridge insertion direction. FIG. 7 is a partially exploded, perspective view showing the positional relationship among (arrangement of) the loader guide plate 4, the loader drive plate 5 and the cartridge tray 2.

As shown in FIG. 7, the cartridge 1 is inserted into the cartridge tray 2 in the direction of the X arrow. A pin 2-1 is provided to one side surface of the cartridge tray 2 so as to project outwardly. A loader drive groove 5-1 is formed in the side surface of the loader drive plate 5, and the loader drive groove 5-1 comprises a slant portion 5-1a which is higher at the front side thereof and lower at the back side thereof with respect to the X-direction, and a horizontal portion 5-1b connected to the end of the slant portion 5-1a in the Y-direction. Loader guide grooves 4-1 and 4-2 are formed in the side surface of the loader guide plate 4. The pin 2-1 extends so as to penetrate through the loader drive groove 5-1 and the loader guide groove 4-1, and a roller 2-2 which is movable in and along the loader drive groove 5-1 and a roller 2-3 which is movable in and along the loader guide groove 4-1 are rotatably secured to the pin 2-1. These rollers 2-2 and 2-3 have flanges serving as a spacer between the side surface of the cartridge tray 2 and the side surface of the loader drive plate 5 and a spacer between the side surface of the loader drive plate 5 and the side surface of the loader guide late 4. A pin 5-2 is provided to the side surface of the loader drive plate 5 so as to project outwardly, and a roller 5-3 which is movable in and along the loader guide groove 4-2 is rotatably secured to the pin 5-2.

In FIG. 7, the positional relationship among the loader guide plate 4, the loader drive plate 5 and the cartridge tray 2 is shown with respect to one side surface side. However, the same positional relationship is satisfied with respect to the other side surface side. However, as shown in FIGS. 1 and 2, in addition to the pin 2-1, a similar pin 2-1' is provided to the other side surface of the cartridge tray 2 so as to project outwardly. In connection with the pin 2-1', a loader drive groove 5-1' as well as the loader drive groove 5-1 are formed in the other side surface of the loader drive plate 5. The pin 2-1' extends so as to penetrate through the loader drive groove 5-1' and the loader guide groove 4-2, and a roller 2-2' which is movable in and along the loader drive groove 5-1' and a roller 2-3' which is movable in and along the loader guide groove 4-2 are rotatably secured to the pin 2-1' as in the case of the pin 2-1. Further, as shown in FIGS. 1 and 2, in addition to the pin 5-2, a pin 5-2' is provided to the other side surface of the loader drive plate 5 so as to project outwardly, and a roller 5-3' which is movable in and along the loader guide groove 4-2 is rotatably secured to the pin 5-2'.

As shown in FIG. 2, each of the loader guide grooves 4-1, 4-2 comprises a horizontal portion extending in the X-direction and a vertical portion which extends substantially vertically downwardly from the end of the horizontal portion in the X-direction. The shapes of the loader guide grooves 4-1 and 4-2 and the positions of the pins 2-1 and 2-1' are set so that the rollers 2-3, 2-3' arrives at the vertical portions of the loader guide grooves 4-1, 4-2 at the same time.

With the above construction, the loader drive plate 5 and the cartridge tray 2 can be mounted on the loader guide plate 4 so as to be movable in the X and Y directions and the direction perpendicular to the X and Y directions.

A loader drive roller 5-4 is secured to the upper surface of the loader drive plate 5, and it extends to the upper portion of the loader guide plate 4 so as to pass through a groove 4-3 formed on the upper surface of the loader guide plate 4 along the X and Y directions as shown in FIG. 1.

As shown in FIG. 7, an engaging member 2-4 is formed on the cartridge tray 2 so as to be engageable with the engaging projection 1-4 provided to the door of the cartridge 1, and when the cartridge 1 is inserted to a predetermined position of the tray 2, the engaging projection 1-4 and the engaging member 2-4 are engaged with each other to open the cartridge door 1-3.

An external loader drive gear 6 is disposed at the upper side of the loader guide plate 4 so as to be rotatable around the up-and-down direction relatively to the deck base 3. The loader drive gear 6 is driven through a gear train 23 by a loader motor 22 serving as driving means to be rotated in both of the forward and reverse directions as shown in FIG. 6.

A loader drive cam groove 6-1 is formed in the lower surface of the loader drive gear 6, and the loader drive roller 5-4 is fitted to the cam groove 6-1. The cam groove 6-1 comprises a radial-direction portion 6-1a extending in the radial direction of the loader drive gear 6, and a circumferential-direction portion 6-1b which is connected to the outer end of the radial-direction portion 6-1a and extends in the circumferential direction. As shown in FIG. 1B, the groove width of the radial-direction portion 6-1a of the cam groove is set to be slightly larger than the outer diameter of the loader drive roller 5-4, except for the connection end portion with the circumferential-direction portion 6-1b of the cam groove. A spring 6-2 is secured at the X-direction side of the radial-direction portion 6-1a of the cam groove on the lower surface of the loader drive gear 6, and the spring 6-2 biases the loader drive roller 5-4 located in the radial-direction portion 6-1a in the Y direction. Accordingly, even when the loader drive gear 6 is still, the loader drive plate 5 can slightly move in the X direction against the spring 6-2 by the external force while the loader drive roller 5-4 is located in the radial-direction portion 6-1a of the cam groove. That is, in FIGS. 1A and 1B, the spring 6-2 behaves as if it forms an "X-direction side movable wall biasing in the Y direction" of the radial-direction portion 6-1a of the cam groove. In the figures other than FIGS. 1A and 1B, the spring 6-2 is omitted from the illustration.

In FIG. 1A and other figures, the cam groove 6-1 is illustrated by a solid line as if it extends so as to penetrate to the upper surface of the loader drive gear 6. However, this illustration is made for emphasis. Actually, the cam groove 6-1 is formed only at the lower surface side of the loader drive gear 6 as shown in FIG. 6.

Further, the face gear 21 and the driving motor 24 for driving the face gear 21 shown in FIG. 3 are disposed below the loader guide plate 4, the loader drive plate 5 and the cartridge tray 2 so as to be positionally fixed to the deck base 3.

[Threading Mechanism Portion]

A threader drive arm 7 is disposed in the threading mechanism portion so as to be rotatable around the up-and-down direction with the pin 25 at center of the rotation with respect to the deck base 3 as shown in FIGS. 1A and 2. A threader drive roller 7-1 is secured on the upper surface of the threader drive arm 7 so as to be away, from the pin 25 and rotatable around the up-and-down direction. A threading arm 8 is secured to the tip portion of the threader drive arm 7 so as to be rotatable around the up-and-down direction. The threader drive arm 7 and the threading arm 8 constitute the threader drive (arm) member of the present invention.

Figure 8:
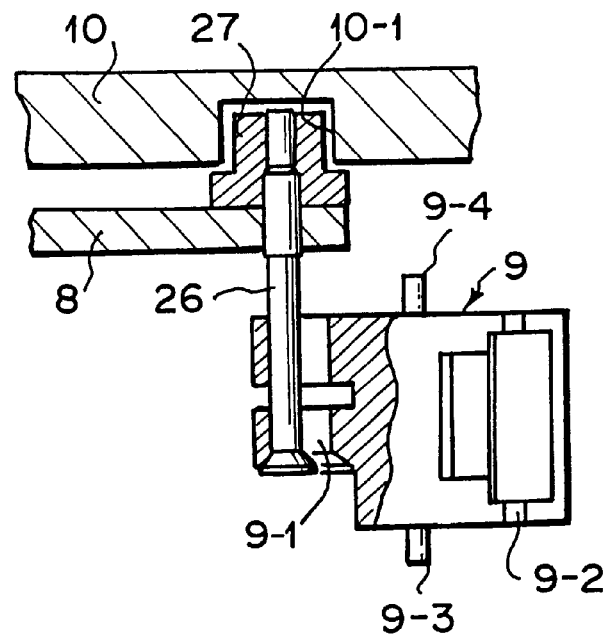
FIG. 8 is a partial, sectional view showing the connection portion between a leader block and a threading arm in the first embodiment of the loading/threading mechanism according to the present invention.
Figure 9:
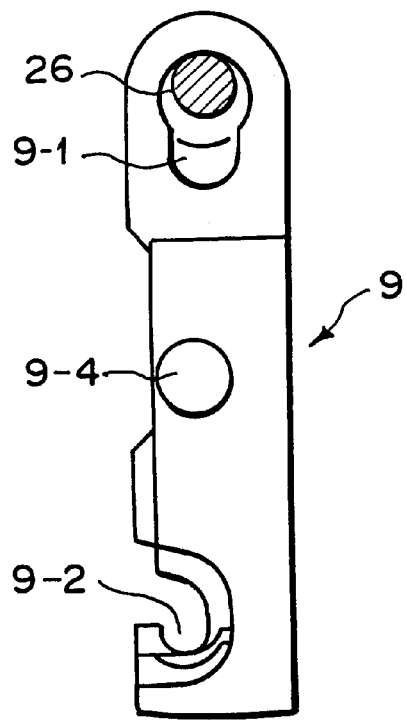
FIG. 9 is a plan view showing the leader block in the first embodiment of the loading/threading mechanism according to the present invention.

As shown in FIG. 8, a pin 26 extending in the up-and-down direction is secured to the tip portion of the threading arm 8, and one end portion of the leader block 9 is secured to the pin 26a at the lower position than the threading arm 8. The pin 26 has a flange portion at the lower end thereof, and the downward movement of the leader block 9 is prevented by the flange portion. That is, as shown in FIG. 9, the leader block 9 is provided with a through hole 9-1 which extends in the up-and-down direction and has a composite shape containing a small circle and a large circle in section. The pin 26 is designed so that the outer diameter of the portion thereof which penetrates through the through hole 9-1 is smaller than the diameter of the small circle and the outer diameter of the flange portion at the lower end thereof is larger than the diameter of the large circle. Accordingly, the leader block 9 is loosely fitted to the pin 26 and held by the pin 26 so as to be rotatable around the pin 26.

The leader block 9 has a leader pin capture groove 9-2 on the side surface of the other end portion, the leader pin capture groove 9-2 extending in the up-and-down direction and being fitted to the leader pin 1-7 affixed to the tip of the magnetic tape 1-6 to capture the leader pin 1-7. A downwardly projecting pin 9-3 and an upwardly projecting pin 9-4 are secured to the leader block 9.

Referring to FIGS. 1A and 2, a threading cam 10 is horizontally disposed at a position higher than the threading arm 8. A threading cam groove 10-1 is formed on the lower surface of the threading cam 10. To the threading cam groove 10-1 is fitted a threading guide roller 27 secured to the upper end of the pin 26 which is secured to the tip of the threading arm 8, as shown in FIG. 8.

As shown in FIGS. 1A and 2, an external threader drive gear 11 is disposed at the upper side of the threading cam 10 so as to be rotatable around the up-and-down direction relatively to the deck base 3. The threader drive gear 11 is engaged with the loader drive gear 6, and rotated in the reverse direction to the loader drive gear 6 when the loader drive gear rotates.

A threader drive cam groove 11-1 is formed on the lower surface of the threader drive gear 11, and the threader drive roller 7-1 is fitted to the cam groove 11-1. The cam groove 11-1 comprises a radial-direction portion 11-1a extending in the radial direction of the threader drive gear 11 and a circumferential-direction portion 11-1b which is connected to the inner end of the radial-direction portion 11-1a and extends in the circumferential direction.

In FIGS. 1A and the other figures, the cam groove 11-1 and the threading cam groove 10-1 are illustrated with solid lines (or illustrated with one solid line) as if they extend to the upper surface of the threader drive gear 11 and the upper surface of the threading cam 10 respectively. However, this illustration is for the purpose of emphasis, and the cam grooves 11-1 and 10-1 are actually formed only at the lower surface sides of the threader drive gear 11 and the threading cam 10 respectively as in the case of the loader drive cam groove 6-1.

Further, a driving motor 30 which is positionally fixed to the deck base 3 and a machine reel 31 which is rotationally driven around the up-and-down direction are disposed at the lower side of the threader drive arm 7 and the threading cam 10.

As shown in FIG. 1A, at the outside of the machine reel 31 in the radial direction, plural tape guide rollers 32 and a magnetic head 34 are disposed between the machine reel 31 and the threading cam groove 10-1 and located along the tape running route inside the tape running route (at the machine reel side).

Figure 10:
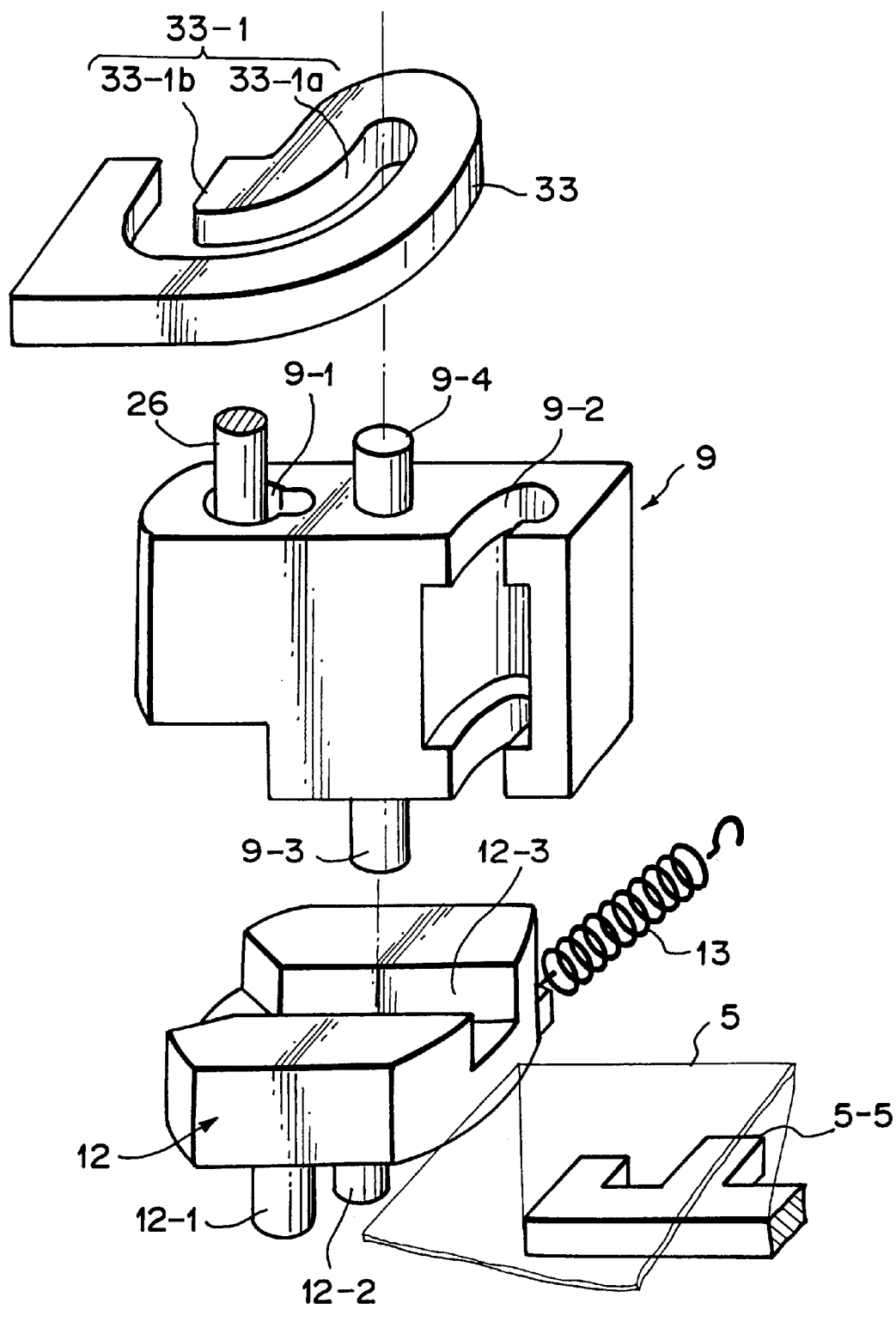
FIG. 10 is an exploded, perspective view showing the engagement relationship among the leader block, a retractor block and the peripheral portions thereof in the first embodiment of the loading/threading mechanism of the present invention.

As shown in FIG. 10, the leader block 9 is fitted to a retractor block 12. The retractor block 12 is equipped with a pin 12-1 extending in the up-and-down direction at the lower portion thereof, and disposed so as to be rotatable around the up-and-down direction with the pin 12-1 at the center of the rotation with respect to the deck base 3. A downwardly projecting retractor pin 12-2 is formed at the lower portion of retractor block 12 so as to be away from the rotational center pin 12-1. The retractor pin 12-2 is located adjacently to the moving route of the cartridge tray 2, and it can be engaged with a retractor cam 5-5 (see FIG. 10) provided to the side surface of the loader drive plate 5 when the cartridge tray 2 is moved in the X direction.

One end of a retractor spring 13 is connected to the side portion of the retractor block 12, and the other end of the spring 13 is fixed to the deck base 3. A linear groove 12-3 is formed on the upper surface of the retractor block 12, and the pin 9-3 of the leader block 9 is fitted to the groove 12-3 so as to be displaced from the pin 12-1.

The leader block 9 is fitted to a horizontally-arranged guide cam 33 as shown in FIG. 10. The guide cam 33 is fixed to the deck base 3, and has a cam groove 33-1. The pin 9-4 of the leader block 9 is fitted in the cam groove 33-1. The cam groove 33-1 comprises an arcuate portion 33-1a having an arcuate shape of substantially 90 degrees and a linear portion 33-1b having a substantially linear shape which has one end connected to one end of the arcuate portion 33-1a and the other end opened to the outside and extends substantially in the radial direction of the arcuate shape. With this construction, the rotation of the leader block 9 around the pin 26 when the pin 26 is located at a predetermined position shown in FIG. 10 is restricted to a predetermined range (that is, the movement of the pin 9-4 of the leader block 9 along the arcuate portion 33-1a of the cam groove enables the leader block 9 to rotate in the angular range of substantially 90 degrees).

Figure 11:
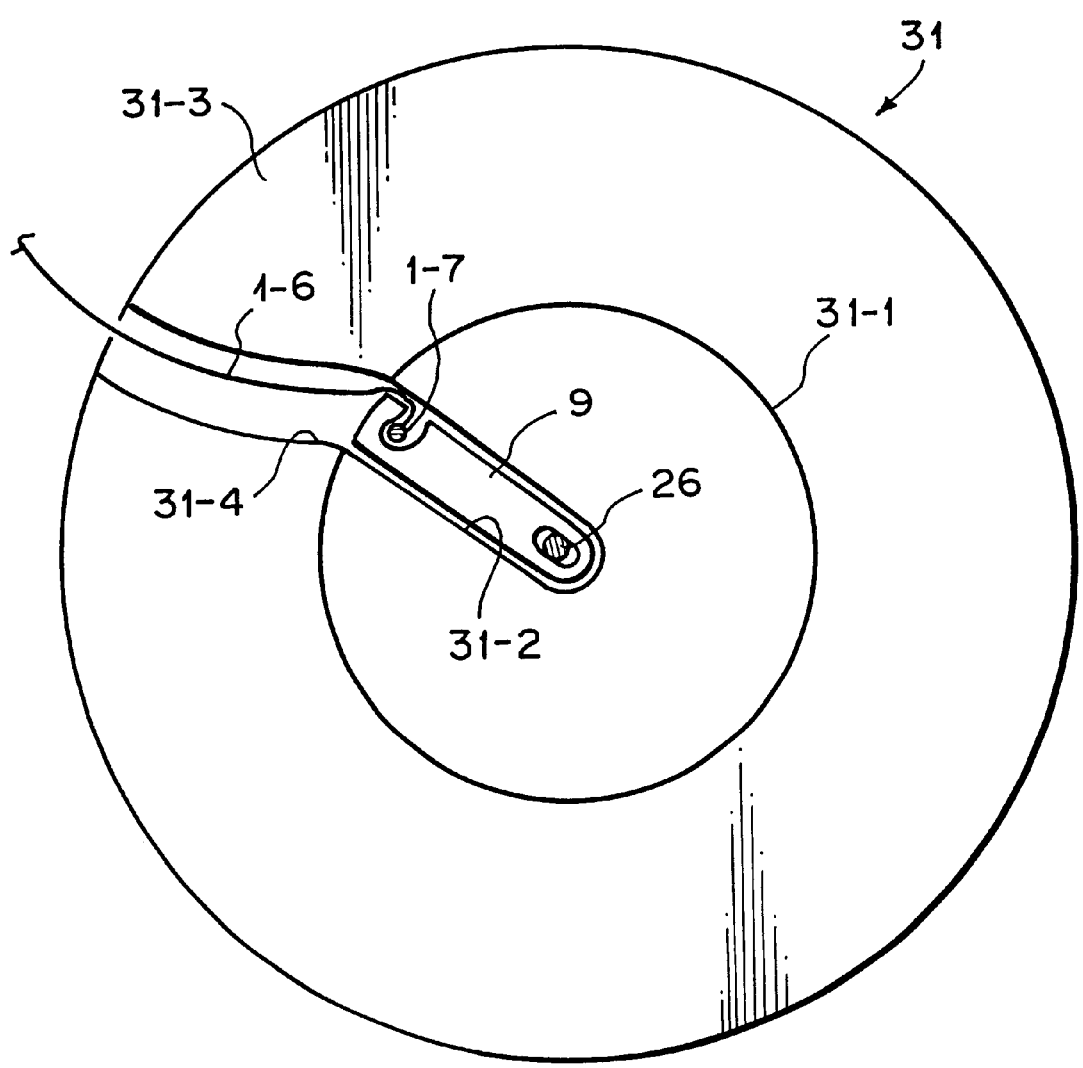
FIG. 11 is a plan view showing the engagement relationship between a machine reel and the leader block in the first embodiment of the loading/threading mechanism of the present invention.

FIG. 11 is a schematic plan view showing the machine reel 31. A notch 31-2 having the shape corresponding to the leader block 9 is formed in the core portion of the machine reel 31, and an upper side flange portion 31-3 of the machine reel 31 is formed with a groove 31-4 which is connected to the notch 31-2 of the core portion at the inner periphery of the upper side flange portion 31-3 and extends to the outer periphery. Accordingly, the leader block 9 is fitted into the notch 31-2 of the core portion of the machine reel while the leader pin 1-7 is captured in the leader pin capture groove 9-2 as shown in FIG. 11.

Next, the operation of the mechanism of this embodiment as described above will be described hereunder.

[Loading Operation]

Eject Position

First, the cartridge 1 is first inserted into the cartridge tray 2 in the direction of X manually or by using a proper handling apparatus as shown in FIGS. 1A, 2, and 7. FIGS. 1A and 2 show the state that the cartridge insertion has been completed. In this state, the cartridge 1 is allowed to be discharged (ejected) from the loading mechanism portion. The position of the cartridge tray 2 under this state is called as "eject position".

When the cartridge 1 is inserted into the cartridge tray 2, the fitting of the cartridge 1 to the cartridge tray 2 is carried out at the time when the cartridge tray 2 arrives at the eject position. That is, as shown in the partial plan views of FIGS. 12A and 12B, a lock block 36 is secured to the side surface of the cartridge tray 2 so as to be rotatable around the pin 35 extending in the up-and-down direction. The lock block 36 has a hook portion 36-1 formed at the tip thereof, and also a cam face portion 36-2 formed on the upper surface thereof. An opening 2-5 through which the hook portion 36-1 passes is formed in the cartridge tray 2 at the position corresponding to the hook portion 36-1 of the lock block. The lock block 36 is biased to the side surface of the cartridge 1 in the direction of an arrow k by biasing means (not shown). A lock hole 1-9 is formed in the side surface of the cartridge 1 so as to be approachable to the position corresponding to the tip of the lock block 36.

In the process that the cartridge 1 is inserted into the cartridge tray 2, the spring 6-2 biases the loader drive roller 5-4 in the Y direction as shown in FIG. 1B, and thus the lock block 36 is located so that the cam face portion 36-2 is fitted to a pin 37 which is positionally fixed to the deck base 3 as shown in FIG. 12A. In this state, the lock block 36 is rotated in the opposite direction by a predetermined angle against the biasing force in the k direction, and the hook portion 36-1 is retracted from the opening 2-5, so that the cartridge 1 can be inserted into the cartridge tray 2 in the X direction without suffering interference by the hook portion 36-1.

After the cartridge 1 is inserted deeply into the cartridge tray 2, the cartridge 1 can be further slightly pushed in the X direction. This is because the loader drive roller 5-4, and thus the loader drive plate 5 can be slightly moved in the X direction against the biasing force of the spring 6-2 relatively to the loader drive gear 6 at the eject position as described with reference to FIGS. 1A and 1B. By the movement of the cartridge 1 and the cartridge tray 2 in the X direction, the lock block 36 arrives at a position where the fitting of the cam face portion 36-2 to the pin 37 is released. In this state, as shown in FIG. 12B, the look block 36 is rotated by the biasing force in the k direction, so that the hook portion 36-1 at the tip of the lock block 36 is passed through the opening 2-5, inserted into the lock hole 1-9 of the cartridge 1 and locked there as shown in FIG. 12B. In this state, the loader drive roller 5-4 is slightly separated from the wall in the Y-direction side in the radial-direction portion 6-1a of the cam groove.

Accordingly, by moving the cartridge tray 2 in the X direction subsequently, the cartridge 1 can be also integrally moved in the X direction. The loading/threading operation using the driving force of the loader motor 22 can be started by detecting the insertion/lock of the cartridge 1 into/to the cartridge tray 2 at the eject position.

When the cartridge 1 is discharged from the cartridge tray 2 in the Y direction at the eject position, the state of FIG. 12B is shifted to the state of FIG. 12A. That is, the lock block cam face portion 36-2 is fitted to the pin 37 which is positionally fixed to the deck base 3, whereby the lock block 36 is rotated in the opposite direction against the biasing force in the k direction, the fitting of the hook portion 36-1 and the lock hole 1-9 is released and the cartridge 1 is allowed to be discharged from the cartridge tray 2 in the Y direction. At this time, the loader drive roller 5-4 is pushed in the Y direction by the fixed wall at the X-direction side of the cam groove radial-direction portion 6-1a at the connection end portion with the cam groove circumferential-direction portion 6-1b, thereby performing the movement of the lock block 36 in the Y-direction from the pin 37.

At the eject position, the engaging projection 1-4 of the door of the cartridge 1 is engaged with the engaging member 2-4 of the cartridge tray 2 to keep the door of the cartridge 1 open as described with reference to FIG. 7.

At the eject position, the loader drive roller 5-4 is engaged with the radial-direction portion 6-1a of the loader drive cam groove 6-1, and the threader drive roller 7-1 is engaged with the circumferential-direction portion 11-1b of the threader drive cam groove 11-1 as shown in FIGS. 1A and 1B.

Further, at the eject position, the pin 2-1, 2-1' is located at the tip in the X-direction in the slant portion of the loader drive groove 5-1, 5-1' so as to be away from the vertical portion of the loader guide groove 4-1, 4-2 at a predetermined distance in the Y direction.

A lock mechanism for the cartridge tray 2 is set so that only when the cartridge 1 is inserted in the cartridge tray 2 in an accurate direction, the subsequent movement of the cartridge tray 1 in the X-direction is allowed.

That is, as shown in FIG. 13A, a lock lever 40 is secured to the cartridge tray 2 so as to be rotatable around a pin 39 extending in the up-and-down direction. The lock lever 40 is biased in the direction of an arrow m by appropriate means (not shown). An engaging portion 40-1 is formed on the lock lever 40, and it is engaged with a pin 41 which is positionally fixed to the deck base 3, thereby preventing the movement of the cartridge tray 2 in the X direction. As shown in FIG. 13A, this state is continued until the tip of the lock lever 40 abuts against the slant side wall surface (side wall surface located obliquely to the X direction) 1-10 formed by cutting out a corner portion of the upper surface of the cartridge 1.

When the cartridge 1 is further moved in the X-direction from the state of FIG. 13A relatively to the cartridge tray 2, the slant side wall surface 1-10 of the cartridge abuts against the tip of the lock lever 40 to rotate the lock lever against the biasing force of the m-direction in the opposite direction, whereby the engagement of the lock lever engaging portion 40-1 and the pin 41 is released, and the movement of the cartridge tray 2 in the X-direction relatively to the deck base 3 is allowed. FIG. 13B shows an eject-allowed state.

The pin 41 shown in FIGS. 13A and 13B is disposed at such a height that the movement of the cartridge tray 2 in the X and Y directions is not disturbed.

When the cartridge 1 is inserted into the cartridge tray 2 in an incorrect direction, the lock release based on the engagement between the slant side wall surface 1-10 of the cartridge and the tip portion of the lock lever 40 as described above is not performed.

Mount Position

Subsequently, the loader drive gear 6 is rotated in the direction of the arrow A by a predetermined angle to change the state of the mechanism from the ejection state shown in FIGS. 1A and 2 to the state shown in FIGS. 14 and 15. In such a process, the cartridge 1 is moved in the X-direction together with the cartridge tray 2 by a predetermined distance. The loader drive roller 5-4 is still engaged with the radial-direction portion 6-1a of the loader drive cam groove 6-1 as shown in FIG. 14 while the threader drive roller 11 is engaged with the circumferential-direction portion 11-1b of the threader drive cam groove 11-1.

Further, in this state, the pins 2-1, 2-1' are located at the connection position between the slant portion and the horizontal portion of the loader drive grooves 5-1, 5-1', and located at the lowest position of the vertical portion of the loader guide grooves 4-1, 4-2.

That is, the cartridge tray 2 as well as the cartridge 1 are downwardly moved and located at a position lower than the position corresponding to the ejection state. At this state, the cartridge reel in the cartridge 1 and the machine reel 31 are located at the same height. As described with reference to FIG. 3, the downward movement of the cartridge 1 allows the engagement between the face gear 20 of the cartridge reel 1-2 and the face gear 21 at the driving motor side and releases the lock of the cartridge reel 1-2.

Figure 14:
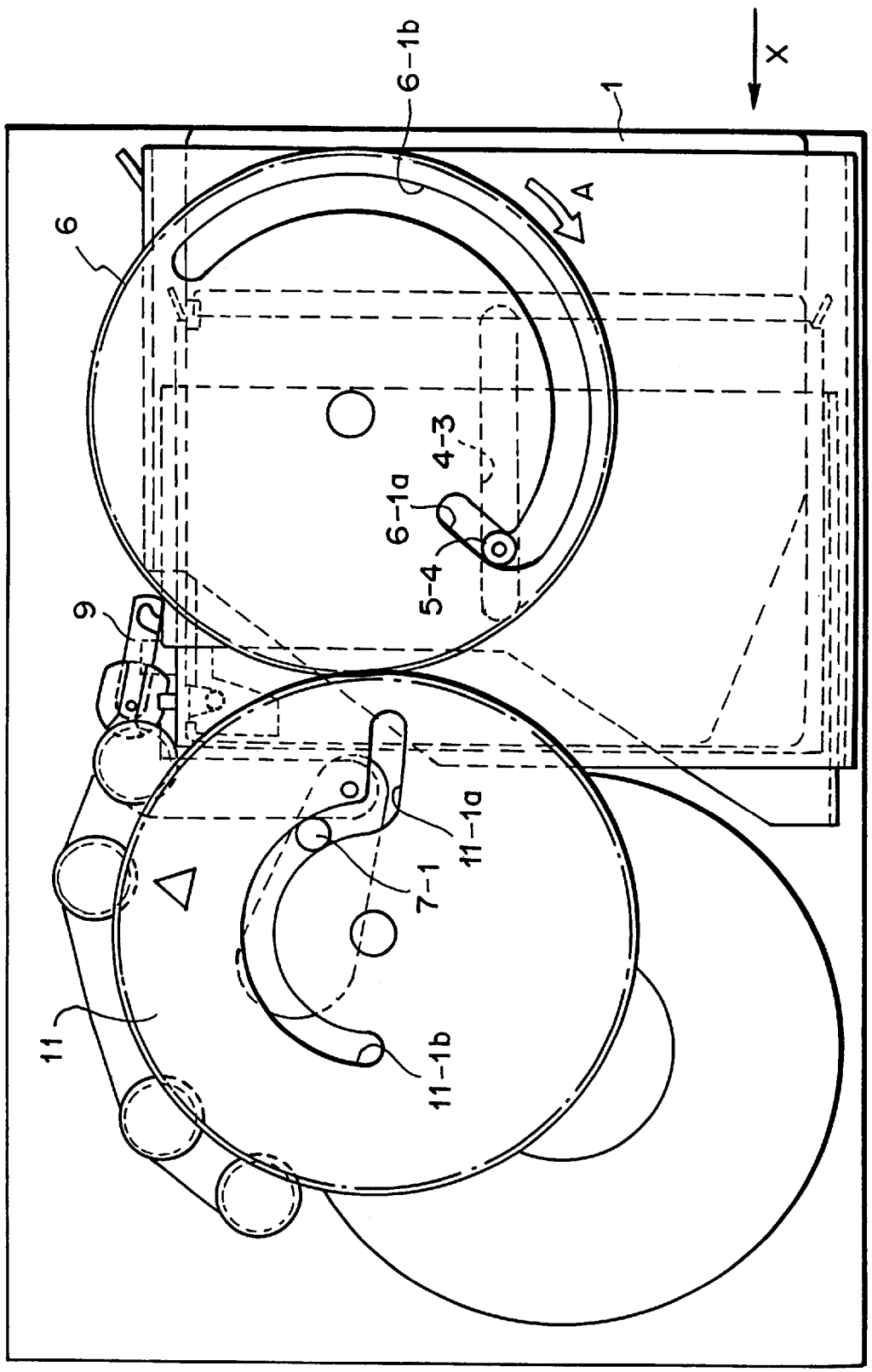
FIG. 14 is a plan view showing the first embodiment of the loading/threading mechanism of the present invention.
Figure 15:
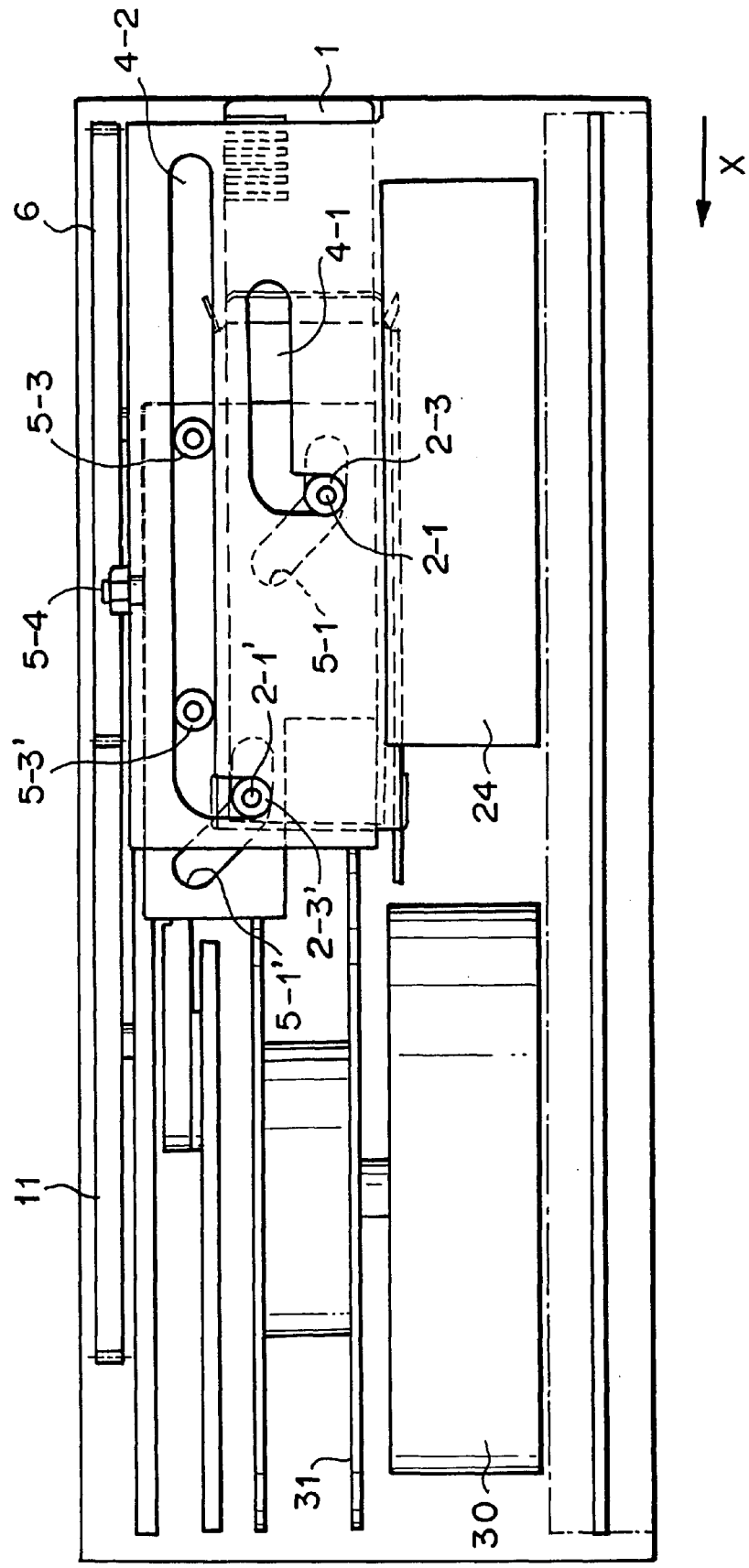
FIG. 15 is a side view showing the first embodiment of the loading/threading mechanism of the present invention.

In the state shown in FIGS. 14 and 15, the standby of the threading operation of the magnetic tape in the cartridge 1 by the threading mechanism portion is completed, and the rotation of the cartridge reel by the driving motor 24 is allowed. The position of the cartridge tray 2 under this state is called as "mount position".

[Threading Operation]

Unload Position (Retracted Position)

The leader block 9 is kept engaged with the retractor block 12 until the mount state of the loading mechanism portion is established. The position of the leader block 9 under the state that the leader block 9 is engaged with the retractor block 12 is called as "unload position".

In the unload position, particularly the state (position) where the leader block 9 is disposed substantially along the X-Y direction by the biasing force of the retractor spring 13 and retracted from the cartridge movement route so that it does not obstruct the movement of the cartridge 1 as shown in FIGS. 11A, 10, 14 is called as "retracted position".

(Leader Pin Captured Position)

Subsequently, the loader drive gear 6 is rotated in the direction of the arrow A by a predetermined angle to change the state of the mechanism from the state shown in FIGS. 14 and 15 to the state shown in FIGS. 16 and 17. In the resulting state, the cartridge 1 and the cartridge tray 2 are kept in the retracted position, however, the loader drive plate 5 is slightly advanced in the X-direction from the retracted position. That is, the pins 2-1, 2-1' are located at the Y-direction end of the horizontal portion of the loader drive grooves 5-1, 5-1'.

Figure 16:
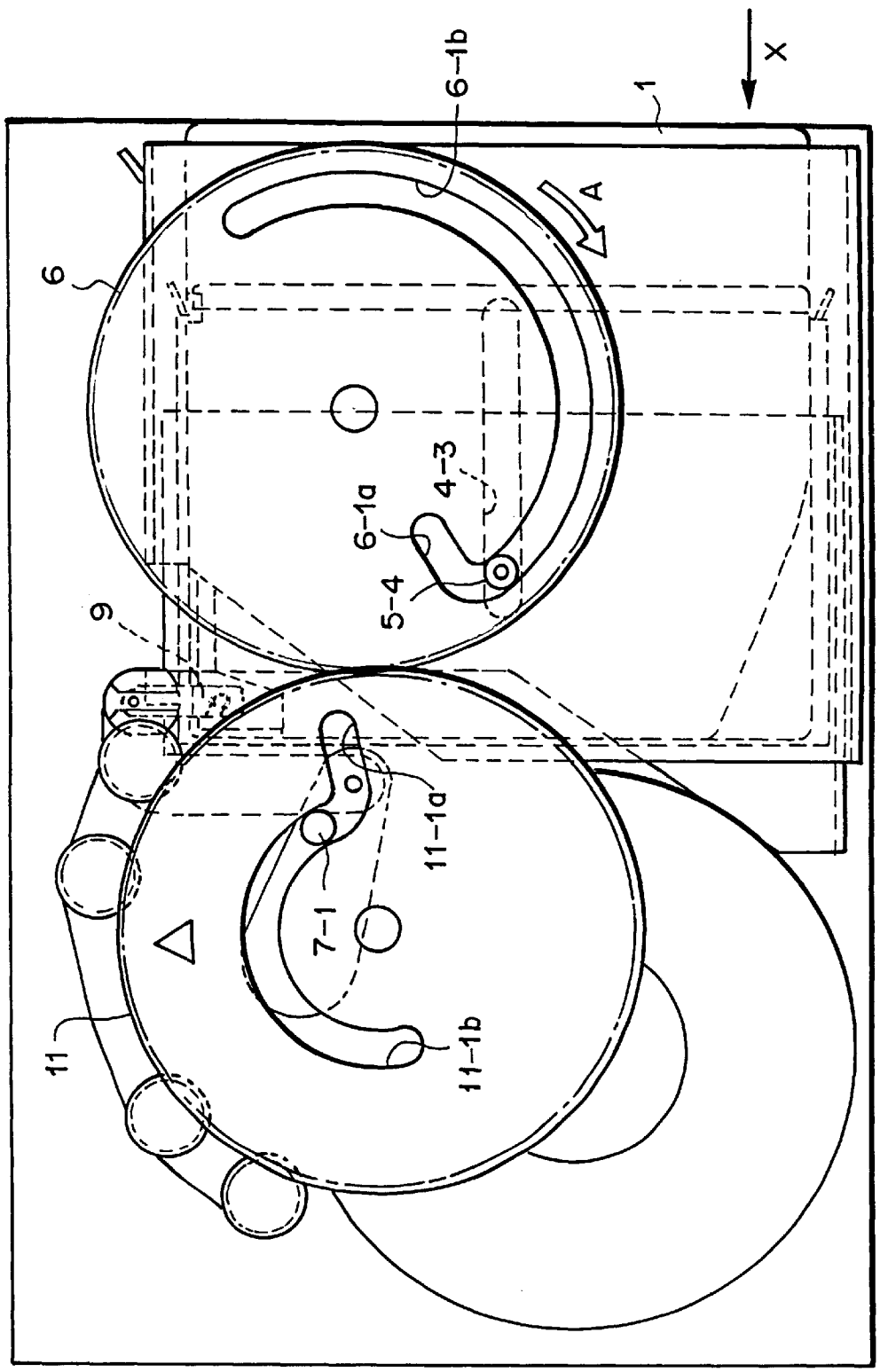
FIG. 16 is a plan view showing the first embodiment of the loading/threading mechanism of the present invention.
Figure 17:
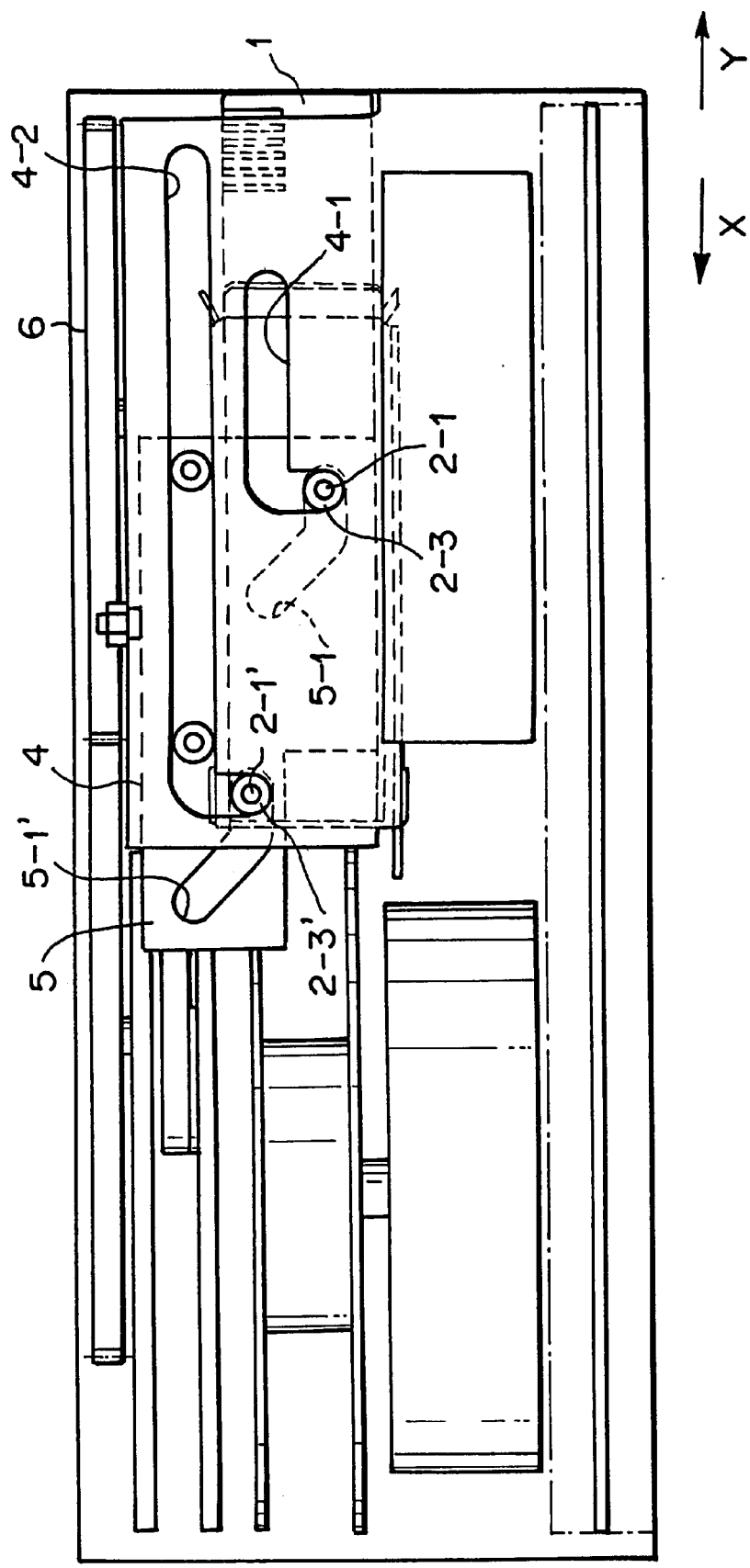
FIG. 17 is a side view showing the first embodiment of the loading/threading mechanism of the present invention.

In this state, as shown in FIG. 16, the loader drive roller 5-4 is engaged with the connection portion between the radial-direction portion 6-1a and the circumferential-direction portion 6-1b of the loader drive cam groove 6-1, and the threader drive roller 11 is engaged with the circumferential-direction portion 11-1b of the threader drive cam groove 11-1.

Figure 18:
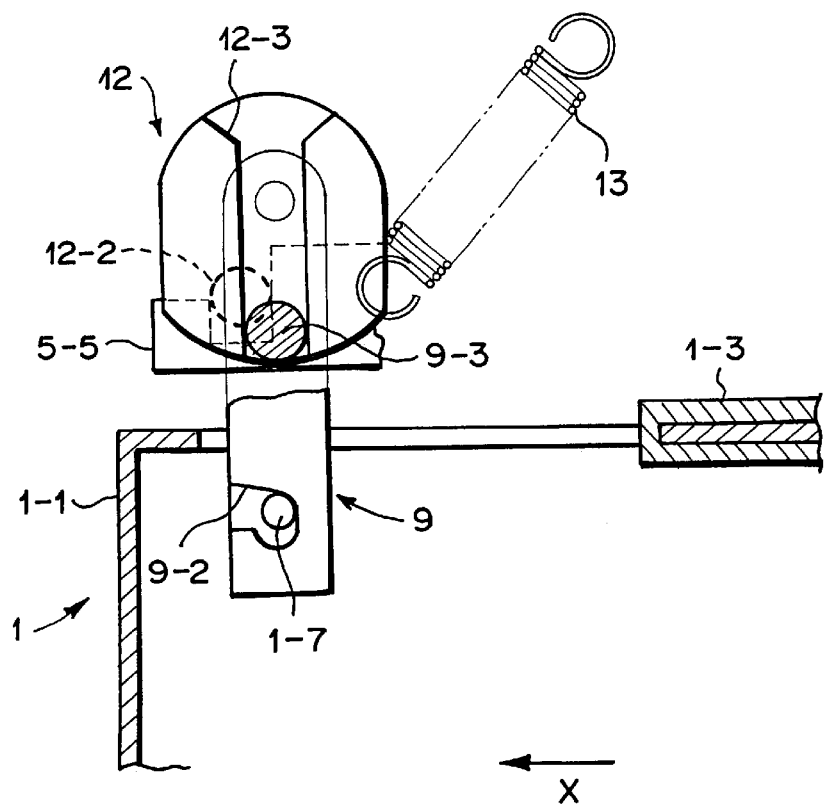
FIG. 18 is a partial, cross-sectional view showing a leader pin capture state in the first embodiment of the loading/ threading mechanism of the present invention.

Under this state, as shown in FIG. 18, the tip portion of the leader block 9 invades from the opening of the cartridge 1 into the cartridge, and the leader pin capture groove 9-2 captures the leader pin 1-7 located at a predetermined position in the cartridge 1. The position of the leader block 9 corresponding to this state is called as "leader pin captured position".

Figure 19A:
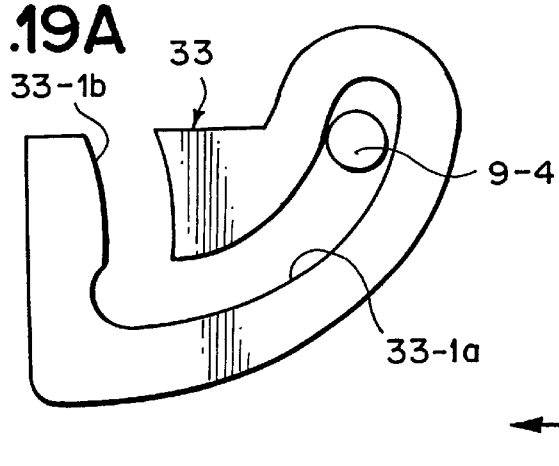
FIGS. 19A and 19B are plan views showing a guide cam in the first embodiment of the loading/threading mechanism of the present invention.

That is, in the shift progress from the retracted position to the leader pin captured position, the retractor cam 5-5 (see FIGS. 10, 18) fixed to the loader drive plate 5 is engaged with the retractor pin 12-2, and the retractor block 12 is rotated around the pin 12-1 in the clockwise direction of FIG. 18 by about 90 degrees against the tensile force of the spring 13, whereby the leader block 9 which is engaged with the groove 12-3 of the retractor block 12 through the pin 9-3 is rotated around the pin 26 by about 90 degrees. When the leader block 9 is rotated, the pin 9-4 is moved from the deepest position in the cam groove arcuate portion 33-1a of the guide cam 33 shown in FIG. 19A to the connection portion between the arcuate portion 33-1a and the linear portion 33-1b of the cam groove shown in FIG. 19B.

As shown in FIG. 18, the rotation of the leader block 9 by substantially 90 degrees makes the tip portion of the leader block invade from the opening of the cartridge 1 into the cartridge, whereby the leader pin 1-7 located at a predetermined position in the cartridge 1 is captured by the leader pin capture groove 9-2.

Load Position

Figure 20:
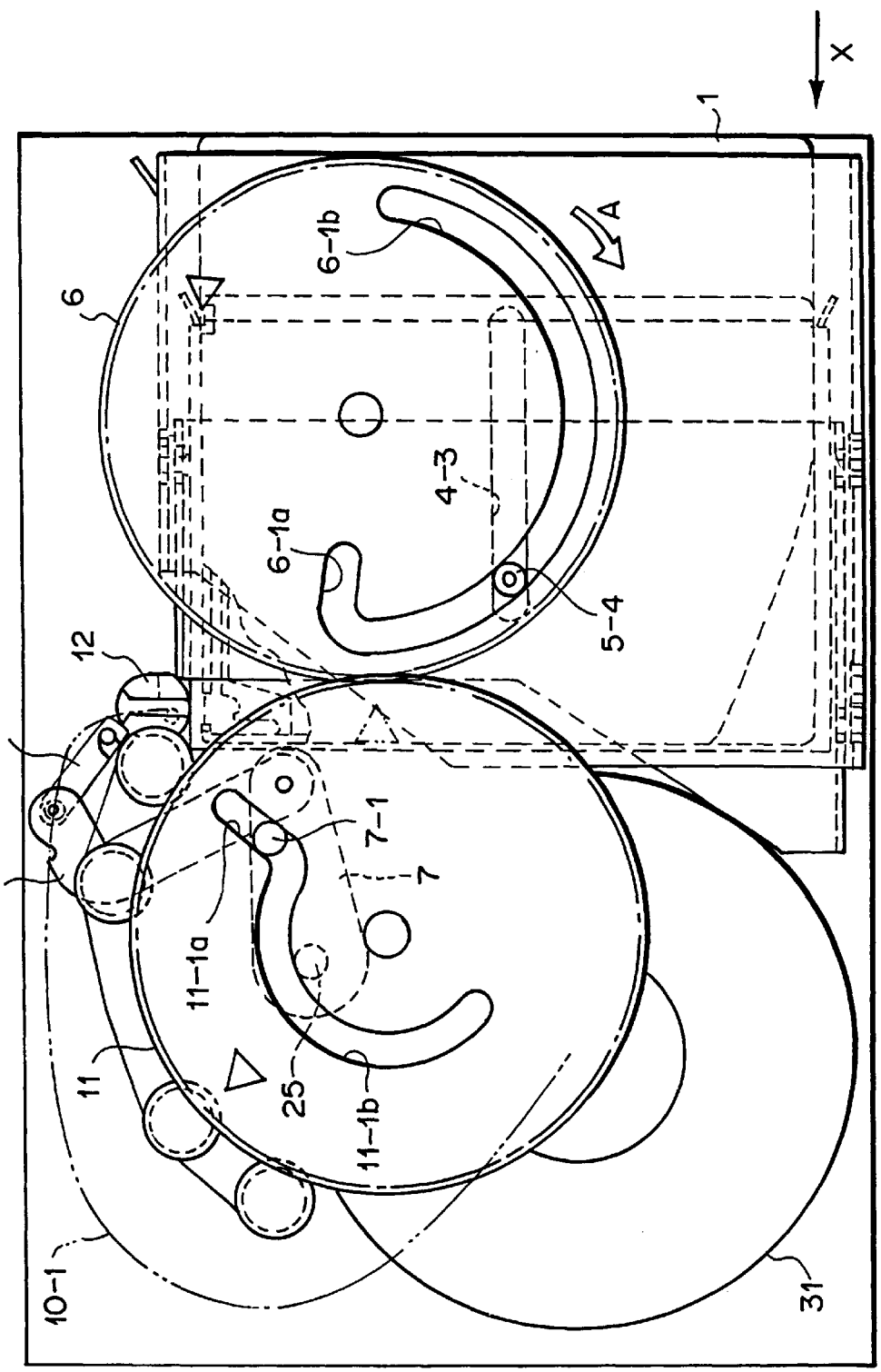
FIG. 20 is a plan view showing the first embodiment of the loading/threading mechanism of the present invention.

Subsequently, the loader drive gear 6 is rotated in the direction of the arrow A by a predetermined angle to change the state of the mechanism from the state shown in FIGS. 16 and 17 to the state shown in FIG. 20 and then to the state shown in FIG. 21. In the resulting states, the loader drive roller 5-4 is engaged with the circumferential-direction portion 6-1b of the loader drive cam groove, and thus the X-direction positions of the loader drive plate 5, the cartridge 1 and the cartridge tray 2 are identical to those of the leader pin captured position.

Figure 21:
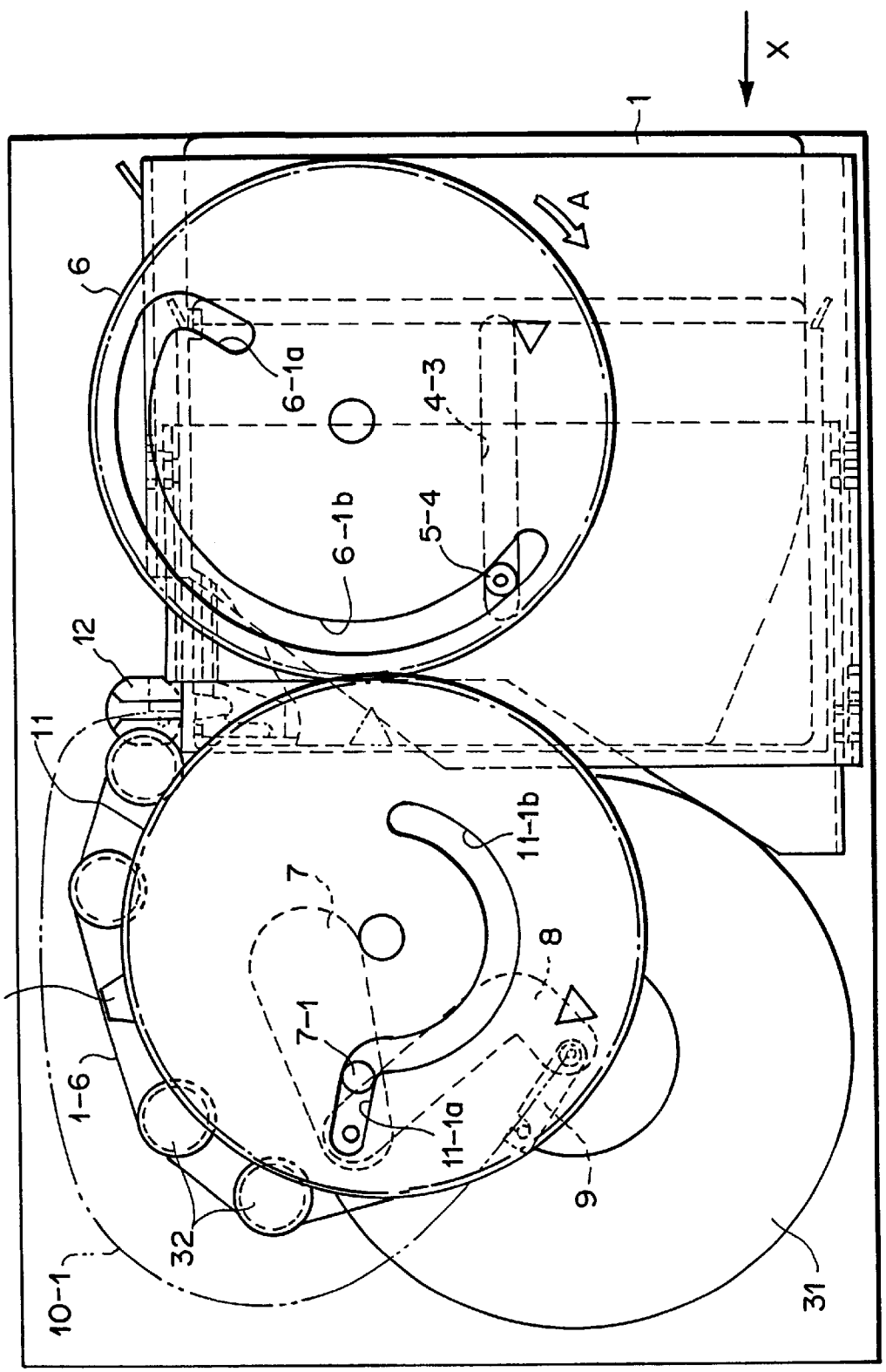
FIG. 21 is a plan view showing the first embodiment of the loading/threading mechanism of the present invention.

In the state of FIG. 21, the leader block 9 is fitted to the core portion of the machine reel 31. The position of the leader block under the state that the leader block 9 is fitted to the machine reel 31 is called as "load position".

In the shift progress from the leader pin captured position to the load position, the threader drive roller 7-1 is first located in the circumferential-direction portion 11-1b of the threader drive cam groove, and thus the threader drive arm 7 and the threading arm 8 stand still (the threader drive roller 7-1 runs idle). During this idle period, the standby for the subsequent threading operation, for example, application of the tape tension and other operations can be performed.

Since the threader drive roller 7-1 will be soon located in the radial-direction portion 11-1a of the threader drive cam groove, the threader drive arm 7 is rotated around the pin 25 to thereby produce horizontal tensile force to the leader block 9 through the threading arm 8 and the pin 26 secured to the tip of the threading arm 8.

Since the threading guide roller 27 secured to the pin 26 is engaged with the threading cam groove 10-1 as shown in FIG. 8, the leader block 9 starts to move along the threading cam groove 10-1 to the machine reel 31.

Figure 19B:
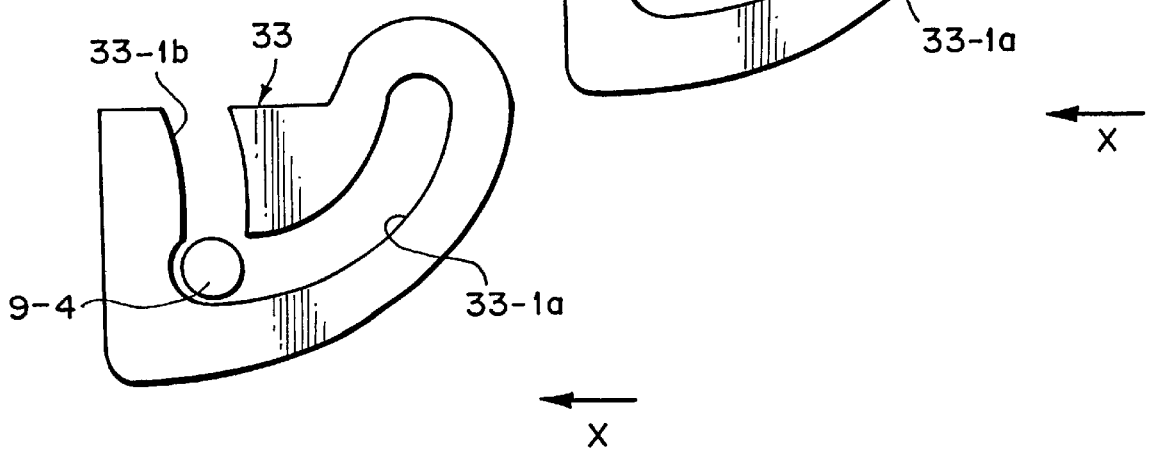

When the movement of the leader block 9 starts, the groove 12-3 of the retractor block 12 is set to be substantially perpendicular to the X-direction as shown in FIG. 18, and the linear portion 33-1b of the cam groove 33-1 of the guide cam 33 is substantially perpendicular to the X-direction as shown in FIG. 19B. Therefore, the pin 9-3 at the lower side of the leader block 9 and the pin 9-4 at the upper side thereof can be moved in the direction substantially perpendicular to the X-direction so as to move along the groove 12-3 and the cam groove portion 33-1.

Accordingly, the engagement of the leader block 9 with the retractor block 12 and the guide cam 33 is released, and the leader block 9 is moved along the threading cam groove 10-1 while held by the pin 26. During the movement of the leader block 9, the magnetic tape 1-6 is drawn out of the cartridge 1. FIG. 20 shows such a state that the leader block 9 is being fed at some midpoint.

Under the load state of FIG. 21, the leader block 9 invades into the notch 31-2 of the core portion of the machine reel 31 (see FIG. 11). As shown in FIG. 21, the magnetic tape 1-6 thus drawn out is tensed along the tape guide roller 32 by the tensile force which is applied to the magnetic tape when the magnetic tape is drawn out of the cartridge 1, thereby allowing the magnetic head 34 to make an access to the magnetic tape.

As shown in FIG. 8, the upper surface of the lower-end flange portion of the pin 26 is tapered, and in connection with this tapered structure, a taper surface is formed at the lower end portion of the leader block through hole 9-1. Accordingly, when the leader block is moved, the taper surface at the lower end portion of the pin through hole 9-1 and the tapered upper surface of the flange portion at the lower end of the pin 26 are engaged with each other to keep the leader block 9 at a predetermined height, whereby the tension of the magnetic tape can be excellently performed.

The rotational position of the machine reel 31 is set so that the groove 31-4 of the flange portion of the machine reel 31 and the threading cam groove 10-1 are lined up before the leader block 9 arrives at the machine reel 31. The setting of the rotational position may be performed by using a combination of electrical signals obtained from photoelectrical means such as a photointerruptor for detecting some light intercepting walls which are formed along the circumferential direction on the upper or lower surface of the threader drive gear 11 so as to have a starting end and a terminating end. With this operation, the pin 26 supporting the leader block 9 can pass through the groove 31-4 of the flange portion of the machine reel 31 and advance into the notch 31-2 of the core portion.

Figure 22A:
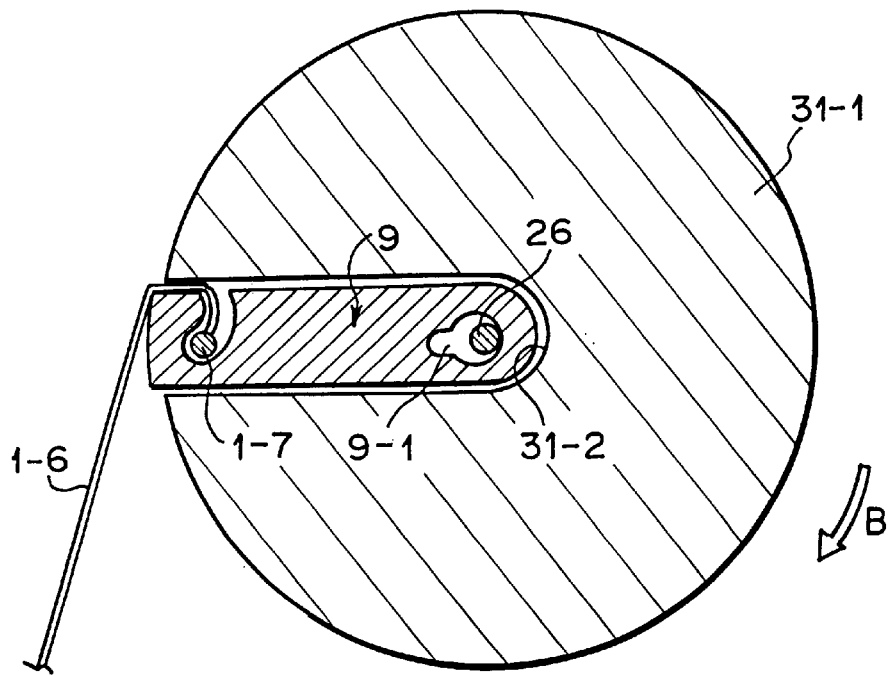
FIGS. 22A and 22B are plan views showing the engagement relationship between the machine reel and the leader block in the first embodiment of the loading/threading mechanism of the present invention.
Figure 22B:
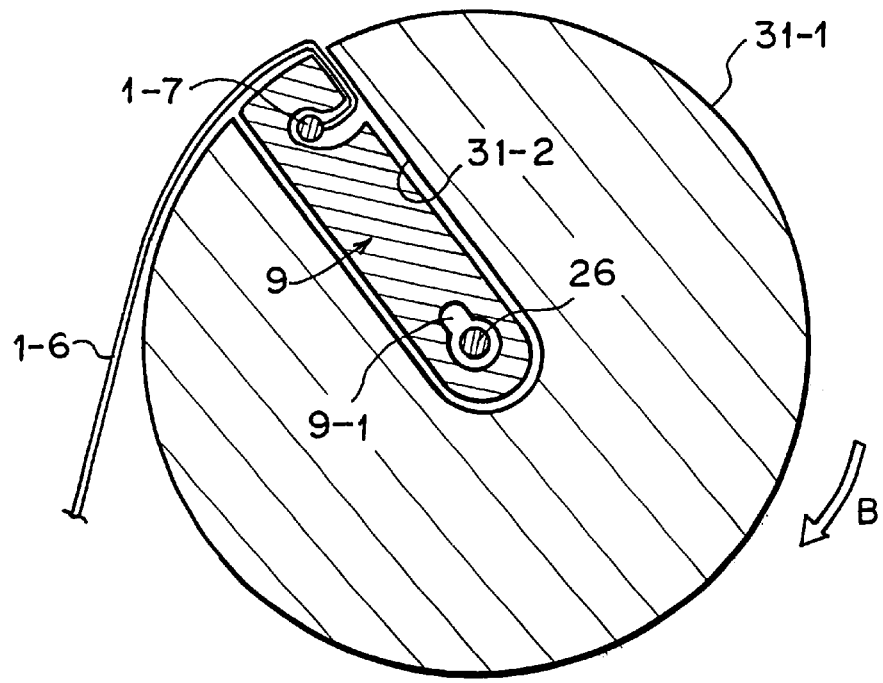

After the tape threading operation as described above has been completed, the machine reel 31 is driven by the motor 30. FIGS. 22A and 22B show variation of the relationship between the machine reel core portion 31-1 and the leader block 9 at that time. That is, before the machine reel is driven, the pin 26 is located at the rotational center of the machine reel and brought into contact with the inner surface of the through hole 9-1 of the leader block 9 as shown in FIG. 22A. The end portion (the end portion at the leader pin capture groove side) of the leader block 9 at the opposite side to the through hole 9-1 is located so as to slightly project from the outer periphery of the reel core portion 31-1.

Thereafter, when the machine reel 31 is rotated in the direction of an arrow B by the motor 30, due to the tensile force applied from the machine reel core portion 31-1 to the tape, the end portion of the leader pin capture groove side of the leader block 9 is pressed inwardly and slightly moved toward the core center, whereby the through hole 9-1 of the leader block and the pin 26 are kept in non-contact with each other. Therefore, the leader block 9 can be rotated integrally with the reel core by the motor 30 while the pin 26 is disposed in the through hole 9-1 having a larger inner diameter than the outer diameter of the pin 26.

Thereafter, the cartridge reel and the machine reel are rotated in desired directions in a desired manner to perform information recording/reproducing operation on the magnetic tape 1-6 through the magnetic head 34.

When the magnetic tape 1-6 is returned to the cartridge reel 1-2 after the information recording/reproducing operation, the cartridge reel 1-2 and the machine reel 31 are first set to a state as shown in FIG. 21 by the reel motors 24, 30, and then the loader motor 22 is rotated in the opposite direction to that when the tape threading is carried out. At this time, the reel motor 24 is also rotated at a proper speed in a predetermined direction so that proper tensile force is applied to the magnetic tape 1-6, whereby the leader block 9 is moved from the load position to the unload position (leader pin captured position), and the leader pin 1-7 arrives at the leader pin accommodation portion 1-8 of the cartridge 1. Subsequently, the rotation of the reel motor 24 is stopped, and the leader block 9 is moved from the leader pin captured position to the retracted position by continuing the rotation of the loader motor 22. Subsequently, the cartridge tray 2 is moved from the mount position to the eject position, whereby the reverse operation to that when the magnetic tape is drawn out is carried out in each part.

In the loading/threading mechanism of the above embodiment, a sequential operation of mounting the magnetic tape cartridge onto the magnetic tape apparatus, drawing the magnetic tape leading end out of the magnetic tape cartridge and connecting the magnetic tape leading end to the machine reel can be performed by a single driving force generating source. Accordingly, the loading/threading operation state can be sufficiently detected by detecting only the rotational angular position of the loader drive gear or the threader drive gear, and thus the number of state detecting sensors for controlling the apparatus can be reduced. Further, the number of driving force generating sources can be reduced in this embodiment. Therefore, the control circuit of the apparatus can be simplified, and the apparatus can be miniaturized in size and reduced in cost.

Figure 23:
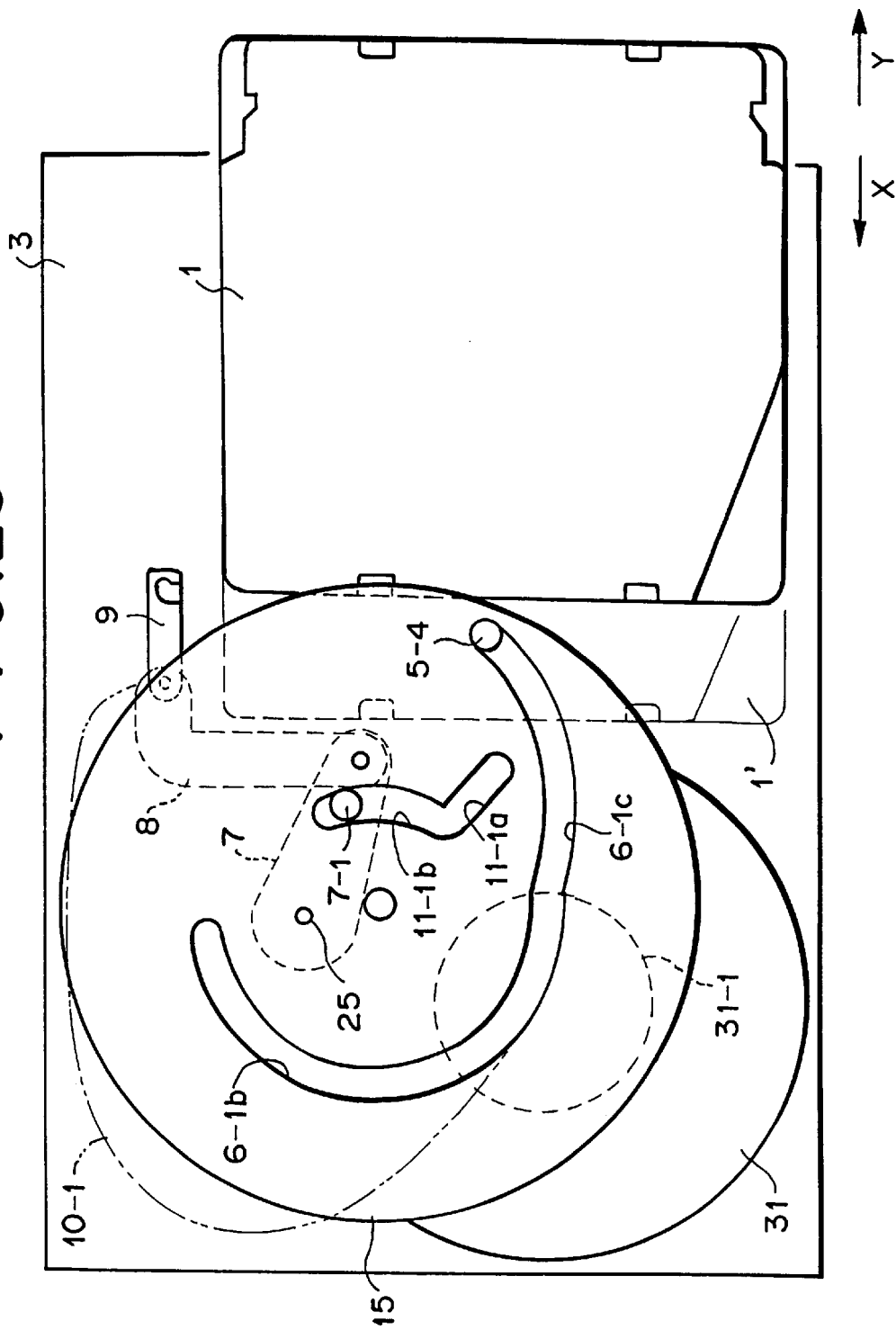
FIG. 23 is a plan view showing a second embodiment of the loading/threading mechanism of the present invention.

FIG. 23 is a plan view showing a second embodiment of the loading/threading mechanism of the cartridge magnetic tape apparatus according to the present invention. In FIG. 23, the elements or parts having the same functions as described with reference to FIG. 1A to FIG. 22B are represented by the same reference numerals.

In this embodiment, the loader drive cam groove and the threader drive cam groove are formed on the same driving gear 15. The threader drive cam groove comprises the radial-direction portion 11-1a and the circumferential-direction portion 11-1b similar to those of the first embodiment, however, the loader drive cam groove comprises a circumferential-direction portion 6-1b similar to that of the first embodiment and a radial/circumferential direction portion 6-1c different from the first embodiment. The radial/circumferential direction portion 6-1c is a non-circumferential direction groove portion having a radial direction component and a circumferential-direction component, and the inner end thereof is connected to the circumferential-direction portion 6-1b while the outer end thereof is located in the neighborhood of the outer periphery of the driving gear 15.

In FIG. 23, the eject position of the cartridge tray is shown, and a cartridge 1' at the mount position is also shown.

The driving gear 15 is driven by a driving motor (not shown) similar to the loader drive motor of the first embodiment. Following the rotation of the driving gear 15, the loader drive roller 5-4 is moved in the radial/circumferential direction portion 6-1c to the circumferential direction portion 6-1b on the basis of the engagement between the loader drive roller 5-4 and the radial/circumferential direction portion 6-1c of the loader drive cam groove, and also moved in the X-direction relatively to the deck base, thereby performing the movement of the cartridge tray from the eject position to the mount position and the subsequent movement of the leader block from the retracted position to the leader pin captured position performed in the first embodiment. The subsequent operation is the same as the first embodiment.

In this embodiment, the same effect as the first embodiment can be achieved, and also the apparatus can be further miniaturized because of use of the single driving gear 15 as a driving rotator.

In the above embodiment, the gear is used as the driving rotator or the driving rotating member. However, a pulley, a roller or other rotators or rotating members may be used in the present invention. Further, the linkage between a first rotator and a second rotator may be performed by suspending a chain or belt around these rotators or pressing these rotators to each other.

What is claimed is:

1. A loading/threading mechanism of a single reel cartridge magnetic tape apparatus, comprising:
    a loading mechanism for moving a cartridge tray for accommodating a cartridge between an eject position at which the cartridge is mountable/demountable into/from said cartridge tray and a mount position at which a reel of the cartridge is engaged with cartridge reel rotating means of said magnetic tape apparatus; and
    a threading mechanism for moving a leader block engageable with a leader pin affixed to the tip portion of a magnetic tape accommodated in the cartridge through a predetermined route between an unload position in the neighborhood of said cartridge tray located at the mount position and a load position in a notch of a core portion of a reel of the magnetic tape apparatus to which the leader block is fitted;
    wherein at the unload position, the leader block can be located at a retracted position at which the leader block is retracted from the cartridge accommodated in said cartridge tray located at the mount position, and a leader pin captured position at which the leader block is engaged with the leader pin affixed to the tip portion of the magnetic tape in the cartridge accommodated in said cartridge tray located at the mount position, said loading mechanism and said threading mechanism being driven by using a single driving force generating source.

2. The loading/threading mechanism as claimed in claim 1, wherein said loading mechanism has a loader drive rotator having a loader drive cam groove, and a loader drive member which is reciprocatively movable in one direction to translate said cartridge tray between the eject position and the mount position, said loader drive member has a loader drive engaging member which is engaged with said loader drive cam groove, said threading mechanism has a threader drive rotator having a threader drive cam groove and a threader drive member for driving said leader block to move between the unload position and the load position, said threader drive member has a threader drive engaging member which is engaged with said threader drive cam groove, said loader drive rotator and said threader drive rotator are connected to each other so that a rotational driving force is transmitted therebetween, and a driving force is transmitted from said driving force generating source to one of said loader drive rotator and said threader drive rotator.

3. The loading/threading mechanism as claimed in claim 1, wherein said loading mechanism has a loader drive cam groove formed in a driving rotator, and a loader drive member which is reciprocatively movable in one direction to translate said cartridge tray between the eject position and the mount position, said loader drive member has a loader drive engaging member which is engaged with said loader drive cam groove, said threading mechanism has a threader drive cam groove formed in said driving rotator and a threader drive member for driving said leader block to move between the unload position and the load position, said threader drive member has a threader drive engaging member which is engaged with said threader drive cam groove, and a driving force is transmitted from said driving force generating source to said driving rotator.

4. The loading/threading mechanism as claimed in any one of claims 2 to 3, wherein said threading mechanism has a retractor for moving said loader drive member under the state that said cartridge tray is disposed at the mount position, thereby shifting said leader block from the retracted position to the leader pin captured position, and said retractor has a retractor pin which is engageable with a retractor cam secured to said loader drive member, and a groove which is engageable with a pin secured to said leader block.

5. A loading/threading mechanism of a single reel cartridge magnetic tape apparatus as claimed in claim 1, characterized in that:
    a driving rotator is provided;
    a loader drive cam groove comprising a first circumferential direction groove portion and a first non-circumferential direction groove portion and a threader drive cam groove comprising a second circumferential direction groove portion and a second non-circumferential direction groove portion are formed in the driving rotator;
    said loader drive cam groove is engaged with a loader drive engaging member affixed to a loader drive plate;
    said loader drive plate is engaged with a cartridge tray for accomodating a cartridge, whereby in the state that said first non-circumferential direction groove portion of the loader drive cam groove is engaged with said loader drive engaging member, during the rotation of said rotator, said cartridge tray is moved between an eject position at which the mount/demount of the cartridge into/from said cartridge tray is enabled and a mount position at which a reel of the cartridge is engageable with cartridge reel rotating means of the magnetic tape apparatus;
    said threader drive cam groove is engaged with a threader drive engaging member which is affixed to a threader drive arm member rotatable around the rotating center parallel to the rotational center of said rotator so as to be eccentric to the rotating center;
    said threader drive arm is connected to a leader block engageable with a leader pin affixed to the tip portion of a magnetic tape accommodated in the cartridge, whereby in the state that said second non-circumferential direction groove portion of said threader drive cam groove is engaged with said threader drive engaging member, during the rotation of said rotator, said leader block is moved through a predetermined route between an unload position in the neighborhood of said cartridge tray located at the mount position and a load position in a notch of the core portion of a reel of the magnetic tape apparatus to which said leader block is fitted; and said loader drive cam groove and said threader drive cam groove are set to have such a phase that when said loader drive engaging member is engaged with said first non-circumferential direction groove portion of said loader drive cam groove, said threader drive engaging member is engaged with said second circumferential direction groove portion of said threader drive cam groove, and when said threader drive engaging member is engaged with said second non-circumferential direction groove portion of said threader drive cam groove, said loader drive engaging member is engaged with said first circumferential direction groove portion of said loader drive cam groove.

6. A loading/threading mechanism of a single reel cartridge magnetic tape apparatus equipped with a loading mechanism portion and a threading mechanism portion, characterized in that:

said loading mechanism portion has a loader drive gear;

a loader drive cam groove comprising a circumferential direction groove portion and a non-circumferential direction groove portion is formed in the loader drive gear;

said loader drive cam groove is engaged with a loader drive engaging member affixed to a loader drive plate;

said loader drive plate is engaged with a cartridge tray accommodating a cartridge, whereby in the state that said non-circumferential direction groove portion of the loader drive cam groove is engaged with said loader drive engaging member, during the rotation of said loader drive gear said cartridge tray is moved between an eject position at which the mount/demount of the cartridge into/from said cartridge tray is enabled and a mount position at which a reel of the cartridge is engageable with cartridge reel rotating means of the magnetic tape apparatus;

said threading portion has a threader drive gear engageable with the loader drive gear;

a threader drive cam groove comprising a circumferential direction groove portion and a non-circumferential direction groove portion is formed in said threader drive gear;

said threader drive cam groove is engaged with a threader drive engaging member which is affixed to a threader drive arm member rotatable around the rotating center parallel to the rotational center of said threader drive gear so as to be eccentric to the rotating center;

said threader drive arm member is connected to a leader block engageable with a leader pin affixed to the tip portion of a magnetic tape accommodated in the cartridge, whereby in the state that said non-circumferential direction groove portion of said threader drive cam groove is engaged with said threader drive engaging member, during the rotation of said threader drive gear said leader block is moved through a predetermined route between an unload position in the neighborhood of said cartridge tray located at the mount position and a load position in a notch of a core portion of a reel of the magnetic tape apparatus to which said leader block is fitted;

said loader drive gear and said threader drive gear are engaged with each other so that when said loader drive engaging member is engaged with the non-circumferential direction groove portion of said loader drive cam groove, said threader drive engaging member is engaged with said circumferential direction groove portion of said threader drive cam groove, and when said threader drive engaging member is engaged with said non-circumferential direction groove portion of said threader drive cam groove, said loader drive engaging member is engaged with said circumferential direction groove portion of said loader drive cam groove; and there is provided a driving motor for driving the rotation of said loader drive gear or said threader drive gear.

7. The loading/threading mechanism as claimed in any one of claims 6 or 5, including a retractor block engageable with said leader block located at the unload position, wherein said retractor block is rotatable between a first attitude and a second attitude and biased so as to have the first attitude by biasing means, and said retractor block is engaged with said leader block so that in the first attitude said leader block is retracted from the cartridge accommodated in said cartridge tray located at the mount position while in the second attitude said leader block is advanced to the cartridge accommodated in said cartridge tray located at the mount position, said retractor block being set to the second attitude against the biasing force of said biasing means when a retractor cam affixed to said loader drive plate abuts against said retractor block.

8. The loading/threading mechanism as claimed in claim 7, wherein said biasing means comprises a spring.

9. The loading/threading mechanism as claimed in claim 7, wherein said leader block is rotatably secured to said threader drive arm member and has an engaging projection which is engageable with said retractor block, and said retractor block has an engaging groove which is engageable with said engaging projection.

10. The loading/threading mechanism as claimed in any one of claims 6 or 5, wherein a leader pin capture groove engageable with said leader pin is formed in said leader block.

11. The loading/threading mechanism as claimed in any one of claims 6 or 5, including a threading guide groove for setting the predetermined route of the movement of said leader block, and said threader drive arm member is provided with a threading guide engaging member which is engageable with said threading guide groove.

12. The loading/threading mechanism as claimed in any one of claims 6 or 5, wherein said threader drive arm member comprises a first arm portion which is rotatable around said rotating center and has said threader drive engaging member, and a second arm portion which is rotatably connected to said first arm portion and connected to said leader block.

13. A loading/threading mechanism of a single reel cartridge magnetic tape apparatus, characterized in that:

a loader drive cam groove and a threader drive cam groove are formed on a rotating member;

said loader drive cam groove comprises a first groove portion extending in the circumferential direction so as to be kept away from the rotational center of said rotating member at a fixed distance, and a second groove portion which is linked to one end portion of said first groove portion and extends so that the distance from the rotational center of said rotating member is varied, said loader drive cam groove being engaged with a loader drive engaging member affixed to a loader drive member;

said loader drive member is engaged with a cartridge tray on which a cartridge is accommodated, whereby in the state that said second groove portion is engaged with said loader drive engaging member, during the rotation of said rotating member the cartridge tray is moved between an eject position at which the mount/demount of the cartridge into/from said cartridge tray are enabled and a mount position at which a reel of the cartridge is engageable with cartridge reel rotating means of the magnetic tape apparatus;

said threader drive cam groove comprises a third groove portion extending in the circumferential direction so as to be kept away from the rotational center of said rotating member at a fixed distance and a fourth groove portion which is linked to one end portion of said third groove portion and extends so that the distance from the rotational center of said rotating member is varied, said threader drive cam groove being engaged with a threader drive engaging member affixed to said threader drive member;

said threader drive member is connected to a leader block engageable with a leader pin affixed to the tip portion of a magnetic tape accommodated in the cartridge, whereby in the state that said fourth groove portion is engaged with said threader drive engaging member, during the rotation of said rotating member said leader block is moved through a predetermined route between an unload position in the neighborhood of said cartridge tray located at the mount position and a load position in a notch of the core portion of a reel of the magnetic tape apparatus to which said leader block is fitted;

said first to fourth groove portions are set so that when said loader drive engaging member is engaged with said second groove portion, said threader drive engaging member is engaged with said third groove portion, and when said threader drive engaging member is engaged with said fourth groove portion, said loader drive engaging member is engaged with said first groove portion; and there is provided a single driving force generating source for transferring the rotational driving force to said rotating member.

14. The loading/threading mechanism as claimed in claim 13, wherein said rotating member comprises a first rotator and a second rotator which are connected to each other so as to be rotatable in synchronism with each other, said loader drive cam groove is formed in said first rotator, and said threader drive cam groove is formed in said second rotator.

15. The loading/threading mechanism as claimed in claim 14, wherein said first rotator is a loader drive gear, and said second rotator is a threader drive gear, said loader drive gear and said threader drive gear being engaged with each other.

16. The loading/threading mechanism as claimed in claim 13, wherein said loader drive member moves said cartridge tray while a guide engaging member affixed to said cartridge tray is guided in engagement with a loader guide groove formed in a loader guide member.

17. The loading/threading mechanism as claimed in claim 16, wherein said loader guide groove is bent.

18. The loading/threading mechanism as claimed in any one of claims 13 to 17, wherein said leader block is set to be located at one of a retracted position and a leader pin captured position at the unload position, said retracted position being defined as a position at which said leader block is retracted from the cartridge accommodated in said cartridge tray located at the mount position, and said leader pin captured position being defined as a position at which said leader block is engaged with said leader pin affixed to the tip portion of the magnetic tape in the cartridge accommodated in said cartridge tray located at the mount position.

19. The loading/threading mechanism as claimed in claim 18, wherein there is provided a retractor block which is rotatable to rotate said leader block located at the unload position, said retractor block is biased in one rotational direction, said loader drive member is provided with a retractor cam which is engaged with said retractor block to rotate said retractor block in the other rotational direction, and said loader drive member is moved while said cartridge tray is located at the mount position, whereby said leader block is rotated against the biasing force to be shifted from the retracted position to the leader pin captured position.

20. The loading/threading mechanism as claimed in claim 19, including a guide cam for restricting the rotational angle range of said retractor block at the unload position.

21. The loading/threading mechanism as claimed in claim 13, wherein said cartridge tray is provided with an engaging member which is engaged with a door of said cartridge inserted to the eject position to open said door.

22. The loading/threading mechanism as claimed in claim 13, wherein said cartridge tray is provided with a lock member which is engaged with a lock hole of said cartridge inserted to the eject position to fix the cartridge to said cartridge tray.

23. The loading/threading mechanism as claimed in claim 13, including a lock mechanism for fixing said cartridge tray to the eject position, said lock mechanism abutting against a slant surface of said cartridge to release the fixing.

24. The loading/threading mechanism as claimed in claim 13, wherein said leader block is rotatably held with clearance by a support pin secured to said threader drive member, and a threading cam groove for guiding said support pin when said leader block is moved between the unload position and the load position is disposed.

* * * * *